(12) United States Patent
Fujikawa et al.

(10) Patent No.: US 6,836,369 B2
(45) Date of Patent: Dec. 28, 2004

(54) HEAD-UP DISPLAY

(75) Inventors: Takayuki Fujikawa, Okazaki (JP); Hiroshi Ando, Nagoya (JP); Masaru Kakizaki, Nagoya (JP); Kazuya Yasuda, Nagoya (JP)

(73) Assignee: Denso Corporation, Kariya (JP)

( * ) Notice: Subject to any disclaimer, the term of this patent is extended or adjusted under 35 U.S.C. 154(b) by 26 days.

(21) Appl. No.: 10/383,223

(22) Filed: Mar. 7, 2003

(65) Prior Publication Data

US 2003/0214724 A1 Nov. 20, 2003

(30) Foreign Application Priority Data

| Mar. 8, 2002 | (JP) | ............................................ 2002-63984 |
| Jun. 12, 2002 | (JP) | ........................................ 2002-171507 |
| Nov. 22, 2002 | (JP) | ........................................ 2002-339600 |

(51) Int. Cl.$^7$ .......................... G02B 27/14; G02B 28/12
(52) U.S. Cl. ........................ 359/630; 359/640; 359/634
(58) Field of Search ................................ 359/630, 631, 359/633, 634, 638, 639, 640

(56) References Cited

U.S. PATENT DOCUMENTS

| 4,753,514 A | * | 6/1988 | Kubik ......................... 359/618 |
| 5,157,549 A | * | 10/1992 | Suzuki et al. ................ 359/633 |
| 5,334,995 A | * | 8/1994 | Iino ............................. 345/7 |
| 6,404,557 B2 | * | 6/2002 | Curley et al. ................ 359/630 |
| 6,433,935 B2 | * | 8/2002 | Curley et al. ................ 359/630 |
| 2004/0085649 A1 | * | 5/2004 | Repetto et al. .............. 359/633 |

FOREIGN PATENT DOCUMENTS

| EP | 0405540 | 1/1991 |
| JP | A-3-43779 | 2/1991 |
| JP | A-5-8661 | 1/1993 |
| JP | A-6-55957 | 3/1994 |
| JP | A-9-318906 | 12/1997 |

OTHER PUBLICATIONS

Bruce H. Walker, "Optical Design for Visual System", Tutorial Texts in Optical Engineering, vol. TT45, 2000, p. 8.

Takehiro Izumi, "The basics of a 3-Dimensional Image", Jun. 5, 1995, p. 64, lines 7–12.

* cited by examiner

Primary Examiner—Ricky Mack
(74) Attorney, Agent, or Firm—Posz & Bethards, PLC

(57) ABSTRACT

Provided is a head-up display having a prism sheet interposed between a display device and the position of an observer's eye. Control is extended so that points from which light rays having different wavelengths emerge are made different by a predetermined distance from each other so as not to form images at different points by light rays from a point source, relative to the difference between the wavelengths. Otherwise, a distance to an image in a vertical direction is made shorter by a predetermined distance than a distance thereto in a horizontal direction. The vertical angle of each of prisms included in the prism sheet is asymmetrical to a normal to the surface of the prism sheet.

16 Claims, 27 Drawing Sheets

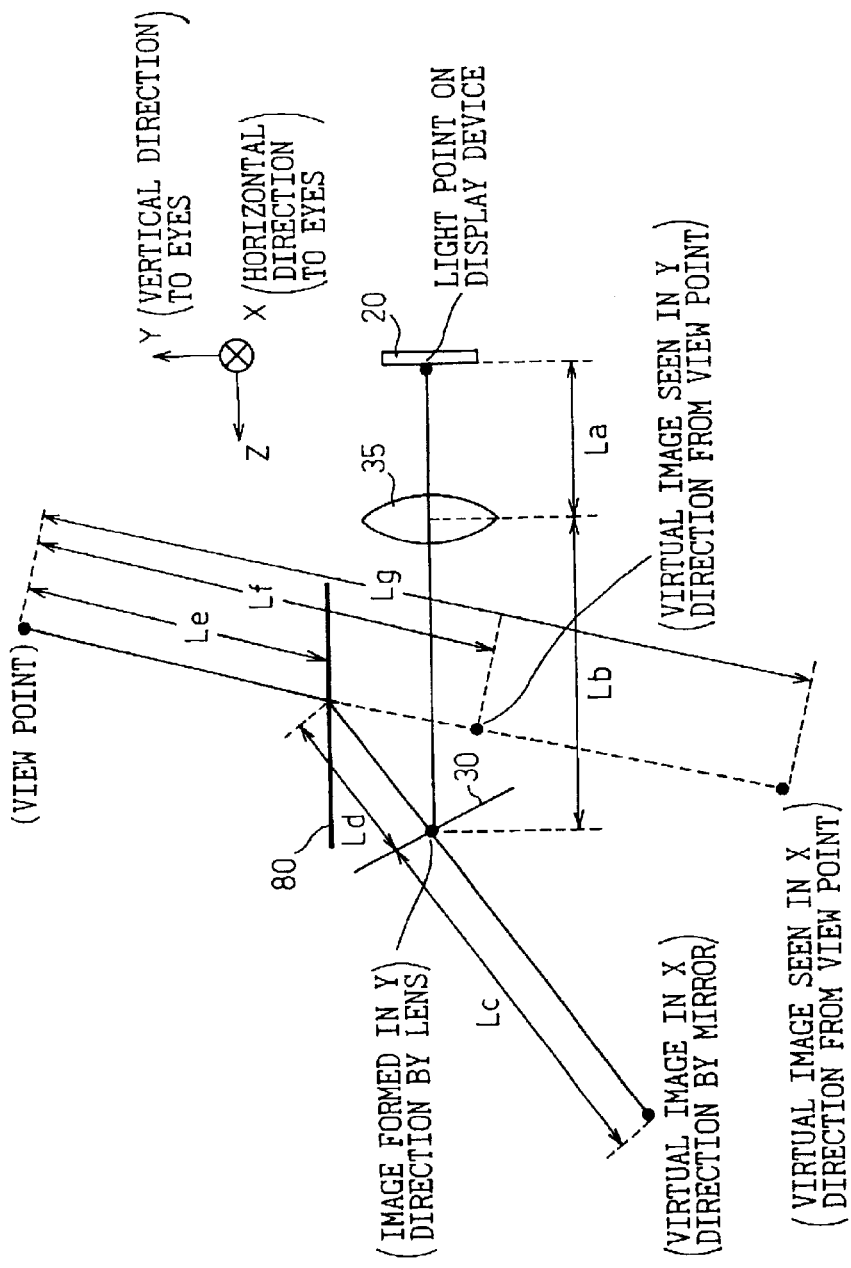

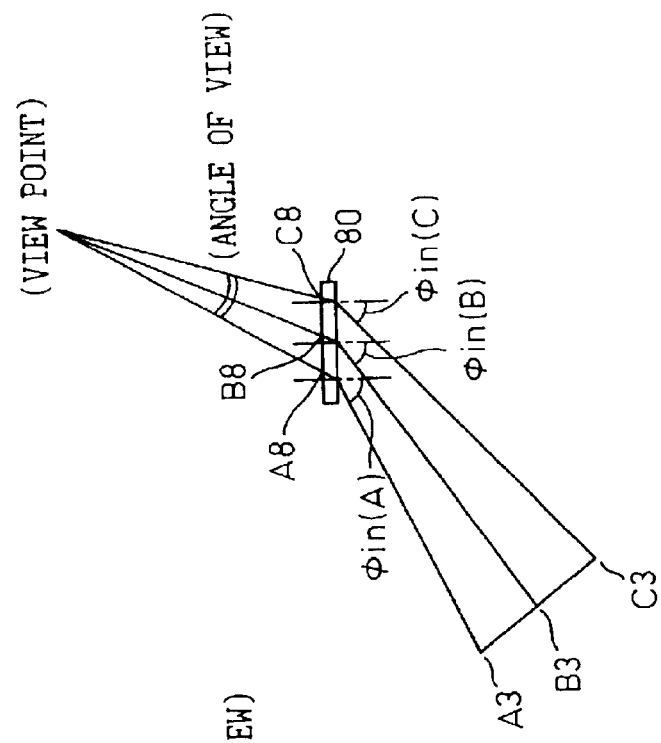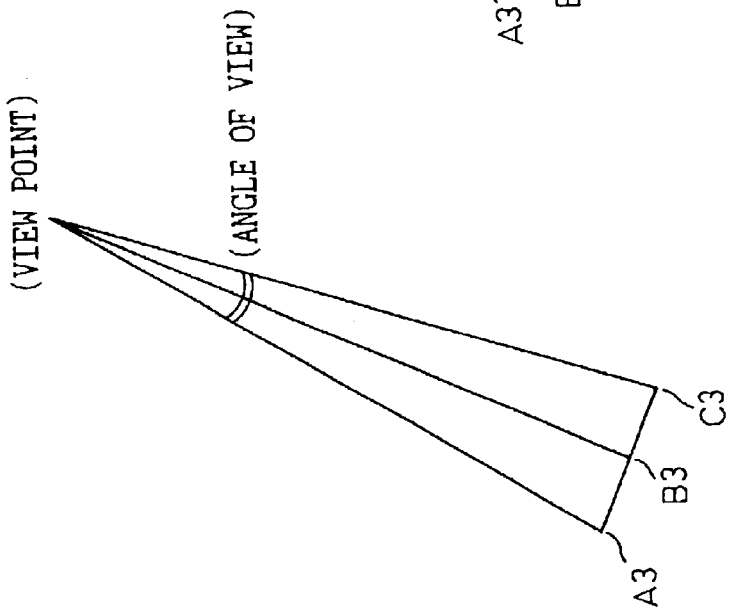

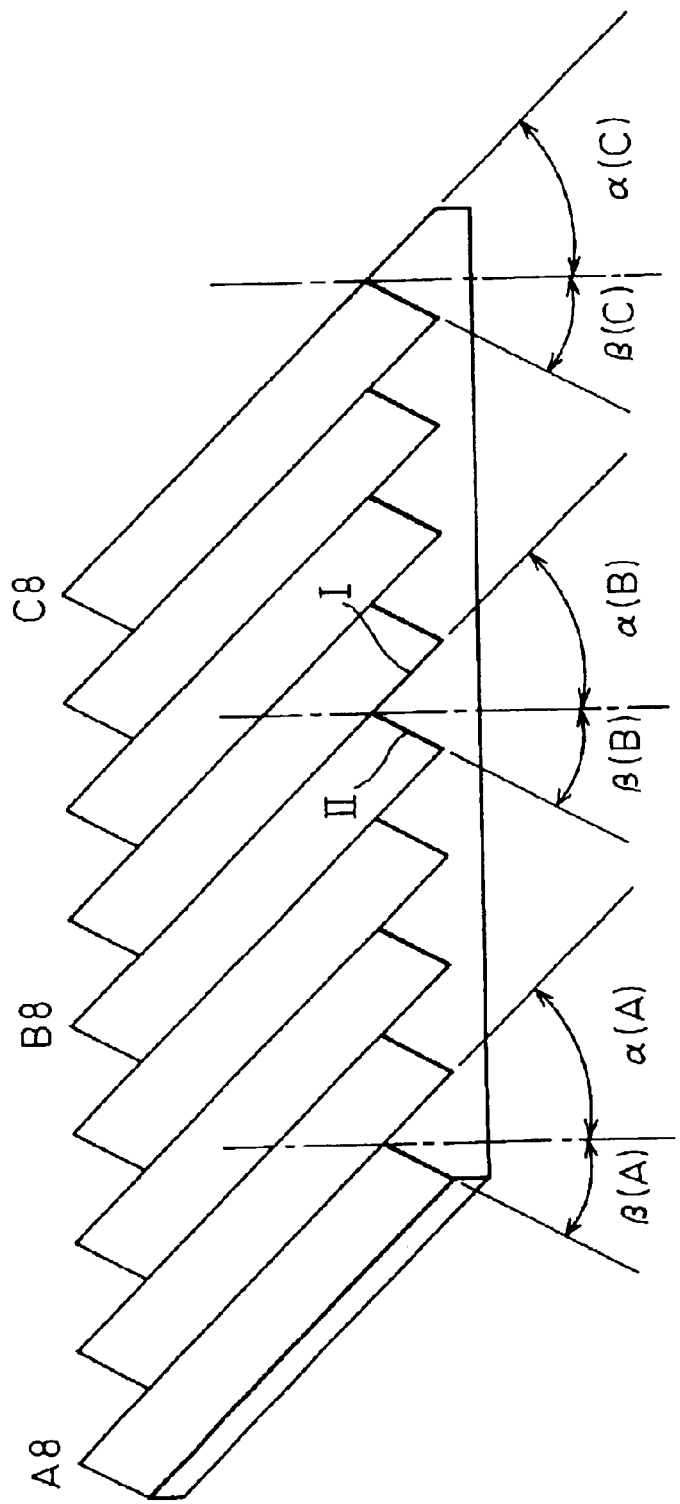

HEAD-UP DISPLAY

BACKGROUND OF THE INVENTION

1. Field of the Invention

The present invention relates to a head-up display, more particularly, to a head-up display adaptable for use in vehicles or motorcars.

2. Description of the Related Art

Demand for human-machine interfaces of images that are excellently discernible and impose little burden on a driver is expected to increase due to the diversity in in-vehicle display information and the plentifulness thereof. In particular, the need for a field of safe driving aid in which view assistance information, visual information, and others are given as the contents of display is expected to increase. For effective communication of the information, preferably, a head-up display capable of presenting a large-size image far away, and superposing one image on another is expected to be adopted.

The head-up display includes an optical unit placed on an installment panel in a vehicle compartment. The optical unit consists mainly of a display device such as a liquid crystal display or a CRT, a reflecting mirror such as a concave mirror, and a dustproof cover. Light coming from the display device is reflected from the reflecting mirror. The light then passes through the dustproof cover that is laid over an opening, and falls on a windshield. The incident light is reflected from the windshield, whereby display information is presented as a virtual image, which is formed forwards beyond the windshield, to a driver. In order to increase the size of the virtual image displayed ahead of the driver, it is necessary to increase the width of a light path at the reflecting mirror and the width of a light path at the display device. This leads to an increase in the size of the optical unit.

However, the optical unit must be small in size in order to guarantee easy mounting of it on the installment panel.

Japanese Unexamined Patent Application Publication No. 6-55957 discloses a head-up display having an optical unit composed mainly of a display device and N (for example, three) deflecting means. A light path between the display device and the first deflecting means and a light path between the second and third deflecting means intersect on a horizontal plane.

The width of the path of light that is deflected by a deflecting means immediately before emerging from the optical unit must be equal to the width of a path of light formed by the conventional art. Furthermore, since a large number of deflecting means is employed, the requirement of a compact design cannot be met because of the space needed to accommodate the deflecting means.

Moreover, Japanese Unexamined Patent Application Publication No. 9-318906 discloses a head-up display having a resin or glass transparent member molded in the form of a block within which light is reciprocated.

However, even in this case, the width of the path of light at a deflecting means immediately before emerging from an optical unit must be equal to the width of a path of light formed by the conventional art. Furthermore, it is very difficult to mold the block so that the block is optically homogeneous.

SUMMARY OF THE INVENTION

Accordingly, an object of the present invention is to provide a head-up display capable of displaying a large-size virtual image far from the view point without deterioration in display quality despite the compact design of the optical unit.

According to the first aspect of the present invention, there is provided a head-up display in which a prism is located on a light path between a display device, which emits light of a plurality of wavelength-bands, and a view point. Herein, the position in the display device which emits light of a certain wavelength-band and the position therein which emits light of another wavelength-band are made different from each other by a distance d determined in consideration of the difference between the paths of the light rays of different wavelengths.

The position of light having a certain range and the position of light having another range on the virtual image from the view point are made different from each other by an angle $|\phi01-\phi02|$ which is within a permissible range.

Consequently, the problem wherein images formed with light rays having different wavelengths and having passed through a prism are seen at different points can be solved. Since the prism is located on a light path, an optical unit can be designed compactly. Consequently, a head-up display capable of presenting a large-size virtual image without deterioration in display definition can be realized at low cost.

When, for example, a typical color display or any other display device having pixels which emit light of a plurality of wavelength-bands is employed, a signal generator according to an aspect V of the present invention can be used. The signal generator generates a signal representing an image in which a pixel emitting light of a first wavelength-band and a pixel emitting light of a second wavelength-band are made different from each other. Thus, the head-up display according to an first aspect is realized. The signal generator according to the fifth aspect is realized with a computer such as a microcomputer including, for example, an LCD or CRT interface. When the feature of the signal generator is realized with a computer, the signal generator can be realized as a program that runs in the computer. In this case, the program is recorded in a computer-readable recording medium such as a flexible disk, a magneto-optical disk, a CD-ROM, a hard disk, a ROM, or a RAM. If necessary, the program is loaded from the recording medium into the computer. Alternatively, the program may be loaded over a network.

In order to design an optical unit compactly, according to the second aspect of the present invention, an optical element is included for changing a light path between a display device and a prism. In this case, the positions of virtual images formed with light rays, of a plurality of wavelength-bands and emitted from the display device, by the optical element are made different from each other by a distance d. In order to make different the positions from each other by the distance d, as described in relation to the first aspect, the position at which light is emitted having a first wavelength-band and the position at which light is emitted having a second wavelength-band, in the picture information displayed on the display device, is made different from each other. Consequently, the positions of the virtual images can be made different from each other. The optical element is, for example, a concave mirror.

Consequently, since the prism is located on the light path, the optical unit can be designed compactly. A head-up display capable of presenting a large-size virtual image without deterioration in display definition can be realized at a low cost.

The light of a plurality of wavelength-bands can be emitted from one or a plurality of display devices. When a plurality of display devices is used, according to a third aspect of the present invention, an optical unit includes a plurality of display devices that emits light rays of a plurality of wavelength-bands and an optical element that synthesizes light rays emitted from the plurality of display devices. The positions of virtual images of the plurality of display devices, which are formed by the optical element, are made different from each other by a distance d. The plurality of display devices that emit light rays having the plurality of wavelength-bands according to the third aspect means a plurality of display devices that emit light rays of different wavelength-bands. A preferable method for separating the positions of virtual images from each other will be described below. Similar to the first and second aspects, the optical unit is made compactly and a large-size virtual image can be displayed, because the prism is located on the light path. Accordingly, the problem wherein images which are formed with light rays of different wavelength-bands are seen at different points by passing through the prism can be solved. Consequently, a head-up display whose display definition is not degraded can be realized at a low cost.

When a display device emits light of center wavelength $\lambda$ and a half width $\Delta\lambda$, the length of a light path between the display device and a prism is L1 and the length of a light path between the prism and an observer's eye is L2, Moreover, an angle of incidence at which light having a wavelength of $\lambda 3=\lambda-\Delta\lambda/2$ incidents on the prism is $\phi i3$, and an angle of emergence of the light is $\phi o3$, an angle of incidence at which light having a wavelength of $\lambda 4=\lambda+\Delta\lambda/2$ incidents onto the prism is $\phi i4$, and an angle of emergence of the light is $\phi o4$. According to a fourth aspect of the present invention, $\Delta\phi=|\phi o4-\phi o3|=(L1/L2)\times(\cos \phi o3/\cos \phi i3)\times|\phi i4-\phi i3|$ is within a predetermined permissible range. In other words, the wider the wavelength-bands of light emitted from the display device, i.e. the larger the half width $\Delta\lambda$, the greater the blurring of a virtual image viewed from the position of a view point. The half width $\Delta\lambda$ is determined so that the difference between the angles of emergence, $\Delta\phi$, falls within the predetermined permissible range. If a display device that emits light having the determined half width $\Delta\lambda$ is adopted, a prism is located on a light path in order to design an optical unit compactly and present, a large-size virtual image, the problem that images which are formed with light rays whose wavelengths is in different wavelength-bands and which passes through the prism are seen at different points can be solved. As a result, a head-up display whose display definition is not degraded can be realized at a low cost.

The head-up display according to the first aspect may include the fifth aspect of the present invention. In this case, the blurring of a virtual image, which occurs with light whose wavelengths are within the plurality of wavelength-bands and which are viewed from the view point will be within the predetermined range. Therefore, specific colors, for example, will not blur, and thus all color images are seen at same points and not blurred. Consequently, a head-up display whose display definition does not deteriorate can be realized.

Preferably, the predetermined permissible range described according to the first aspect is a range equal to or smaller than an angle of view subtended by a portion of a virtual image, which is seen from the view point, corresponding to one display line on the display device. In this case, the adverse effect of light emitted from a certain display line onto another line is avoided.

Preferably, the predetermined permissible range is equal to or smaller than 0.03°. In this case, the magnitude of separation of light rays emitted from a display line is smaller than the resolution of the eyes. Consequently, incorrect coloring and blurring can be prevented.

The plurality of wavelength-bands may include any number of ranges thereof. For example, the wavelength-bands are preferably ranges of wavelengths specific to two of red, green, and blue. In this case, multicolor display or full-color display is feasible.

Preferably, a light source included in a display device is realized with LEDs or laser units. In this case, the half width of the wavelength can be minimized and deterioration in display definition can be prevented. Moreover, the light source can be designed compactly.

In order to realize a compact head-up display, preferably, a small-sized prism is employed. More preferably, a prism sheet is employed. The prism sheet is preferably laid over an opening of an optical unit. The prism sheet may be used as a dustproof cover. In this case, a compact and lightweight head-up display can readily be realized, and a head-up display whose display definition does not deteriorate can be realized at a low cost.

Preferably, picture information is reflected from a windshield or a combiner.

The head-up display can be adopted for various applications. Preferably, the head-up display is used, for example, in vehicles. The view point may be set to the position of the driver's eye. In this case, the head-up display can be designed so as to be compact enough to be installed in a vehicle. Moreover, the head-up display presents various kinds of picture information to the driver in an easy-to-see manner and contributes to safe driving.

According to the sixth aspect of the present invention, a head-up display includes a reflecting means that reflects picture information projected from an optical unit. The picture information can be viewed as a virtual image formed by the reflecting means from the view point. A prism sheet is placed on a light path led to an opening formed in the optical unit in order to project light to the reflecting means. The imaging distance from the view point to an image in a vertical direction is made shorter by a predetermined distance than the imaging distance thereto in the horizontal direction.

The display definition in picture information viewed as a virtual image from the view point deteriorates in proportion to an increase in the difference between angles of view attained when light rays having different wavelengths that emerge from the same point in the display device are incident on the observer's eye. The longer the distance from a point light source to the prism sheet, the larger the difference between the angles of view. In other words, the shorter the distance from the display device to the prism sheet, the better the display definition of picture information.

However, the shorter the distance from the point light source to the prism sheet, the shorter the distance to an image of picture information viewed from the position of an observer's eye. This makes it hard to present a large-size image far away.

Incidentally, when a user (observer) of a head-up display sees (a virtual image of) picture information with his/her eyes, the user has a sense of distance through the convergence of the two eyes. In other words, the user recognizes the distance to an image in a direction horizontal to the eyes. According to the sixth aspect of the present invention, the distance from an observer's eye to an image in a vertical direction is shorter by a predetermined distance than a distance thereto in a horizontal direction.

In this case, the distance to an image in the vertical direction is shorter than the distance thereto in the horizontal direction. The display definition in the vertical direction is therefore higher than that in the horizontal direction. Moreover, since the distance from a view point to an image in the horizontal direction is longer than the distance from the view point to an image in the vertical direction, a display image appears as if to exist far from the view point.

Consequently, the head-up display which the optical unit can be designed compactly can present a large-size virtual image far from the view point without deterioration in display definition despite a difference in wavelength.

When the distance to an image in a direction horizontal to the eyes is noticeably different from the distance thereto in a direction vertical thereto, an observer may feel uncomfortable, like in the case of car-sickness. This is a problem with a display. According to "Fundamentals of Three-dimensional Picture" (Ohmsha Co. Ltd., P.64), when the difference ranges from −0.2 D to +0.2 D (diopter or an reciprocal of a focal length in meters), i.e. the range of the difference is 0.4 D, the user will not become tired. Preferably, when the distance to an image in the direction horizontal to the eyes is longer by a predetermined distance than the distance thereto in the direction vertical thereto, if the predetermined distance falls below 0.4 D, an observer never feels like uncomfortable like in the case of car-sickness. Consequently, not only display definition can be maintained but also an image can be presented far from the view point. Moreover, an observer will not become tired.

Furthermore, an angle of incidence of light, which is emitted from a display device, having a center wavelength $\lambda 1$ within a first wavelength-band is $\phi i1$, and an angle of emergence thereof is $\phi 01$. An angle of incidence of light, which is emitted from the display device, having a center wavelength $\lambda 2$ within a second wavelength-band different from the first band 1 is $\phi i2$, and an angle of emergence thereof is $\phi 02$. In this case, preferably, a tolerance is set to $\Delta \phi = |\phi o1 - \phi o2|$. The tolerance can be determined in consideration of the application of the head-up display, the abilities thereof, and the cost thereof. Preferably, the permissible range is a range equal to or smaller than an angle of view subtended by a portion of a virtual image, which is viewed from the position of an observer's eye, corresponding to one display line in a display device. In this case, light emitted from a certain display line in the display device can be prevented from adversely affecting light emitted from another line. More preferably, the predetermined permissible range is a range equal to or smaller than 0.03°. In this case, the magnitude of separation of light rays emitted from a display line becomes smaller than the resolution offered by the eyes. Thus, an observer can hardly recognize the separation. Consequently, while an optical unit is designed compactly, a head-up display capable of presenting a large-size virtual image and offering improved display definition can be realized.

Various configurations are conceivable for a system in which the imaging distance from an observer's eye to an image in a vertical direction is shorter by a predetermined distance than the imaging distance thereto in a horizontal direction. Preferably, the position in the vertical direction of a virtual image of a display device projected on a prism sheet is made closer to the prism sheet than the position in the horizontal direction thereof is. For example, at least one optical element that needs different focal lengths between the vertical and horizontal directions may be disposed on a light path between the display device and prism sheet. Thus, the position in the vertical direction of the virtual image of the display device projected on the prism sheet is made closer to the prism sheet than the position in the horizontal direction thereof is. Consequently, the distance from the view point to an image in the vertical direction is made shorter by a predetermined distance than the distance thereto in the horizontal direction.

The optical element that has different focal lengths between the vertical and horizontal directions is preferably a reflecting mirror that has a shorter focal length in the horizontal direction than in the vertical direction. Otherwise, the optical element may be a transmission lens that needs a shorter focal length in the vertical direction than in the horizontal direction. For example, light emitted from the display device is passed through the transmission lens and reflected from the reflecting mirror. Thus, a virtual image may be projected on the prism sheet.

As the reflecting means for reflecting picture information projected from the optical unit, a windshield or a combiner may be employed in order to acquire picture information viewed as a virtual image from the view point.

The aforesaid head-up display can be used for various applications. For example, the head-up display may be used for vehicles. In this case, since the head-up display can be designed compactly, it can be readily installed in a vehicle.

Moreover, the view point may be the position of a driver's eye during driving. This results in a head-up display capable of presenting various kinds of picture information to the driver in an easy-to-see manner and contributing to safe driving.

According to the seventh aspect of the present invention, there is provided a head-up display having a prism sheet located on a light path between a display device and a reflecting means. The vertical angle of each of the prisms included in the prism sheet is asymmetric to the normal direction of the prism sheet. Therefore, the efficiency in utilizing light can be improved and brightness can be increased. Moreover, blurring of a display image can be suppressed.

According to the eighth aspect of the present invention, at least one inclined surface of each of the prisms included in a prism sheet is substantially parallel to the direction of light that passes through the prism.

According to the ninth aspect of the present invention, there is provided a head-up display in which one inclined surface of each of the prisms included in a prism sheet thereof is subjected to at least one of a non-transmission finishing or scatter finishing. In other words, out of two inclined surfaces that define the vertical angle of each of the prisms included in the prism sheet, one inclined surface that is not an emerging surface from which light emerges is finished not to transmit light or finished to scatter light. In this case, light that passes through the surface that is not the emerging surface is not transmitted or scattered. Light emerging from the emerging surface and intended to be utilized will not be intercepted, but adverse effects on image quality can be suppressed.

Preferably, an inclined surface that is inclined in a direction substantially parallel to the direction of light that passes through the prism is subjected to non-transmission finishing or a scatter finishing. Consequently, interception of light, which is intended to be utilized, by one surface can be greatly prevented, and adverse effects on image quality can be suppressed.

According to the tenth aspect of the present invention, there is provided a head-up included in a prism sheet varies depending on the position of each prism in a direction of arrangement in the prism sheet. An angle of incidence at which light is incident on the prism sheet varies depending on the position on the prism sheet. If the vertical angle is uniform over the plane of the prism sheet, an angle of emergence varies slightly, depending on a position on the prism sheet. Consequently, an angle of view seen from the position of an observer's eye varies. According to the tenth aspect, the vertical angle of each of the prisms varies, depending on the position of each prism in the direction of arrangement. Therefore, variation of the angle of view seen from the position of an observer's eye can be suppressed, and blurring of an image can be prevented.

According to the eleventh aspect of the present invention, a position adjusting means adjusts the position of a prism sheet. Consequently, the displayed position of a virtual image can be shifted. This results in a head-up display capable of presenting a virtual image that is easy for a user to see.

According to the present invention, preferably, the prism sheet is laid over an opening formed in the optical unit in order to project picture information to the reflecting means through the opening. Thus, the width of a light path to the opening can be reduced, and the optical unit can be designed compactly.

According to the twelfth aspect of the present invention, a head-up display has a prism sheet that also serves as a dustproof cover. A dedicated dustproof cover can therefore be excluded. Consequently, an optical unit can be designed compactly, and the cost of the head-up display can be reduced.

Preferably, a combination of the structure employed in the seventh aspect and a preferable structure for the eighth aspect is adapted for a head-up display.

BRIEF DESCRIPTION OF THE DRAWINGS

The above object and features of the present invention will be more apparent from the following description of the preferred embodiments with reference to the accompanying drawings, wherein:

FIG. 18 is an explanatory diagram showing the configuration of a head-up display in accordance with an embodiment;

FIG. 21A and FIG. 21B are explanatory diagrams concerning an angle of view;

FIG. 22 is an explanatory diagram concerning a case where the vertical angle of each of prisms included in a prism sheet is varied depending on the position of each prism in a direction of arrangement in the prism sheet;

DESCRIPTION OF THE PREFERRED EMBODIMENTS

Before describing the embodiments of the present invention, the related art and disadvantages therein will be described with reference to the related figures.

Figure 27:
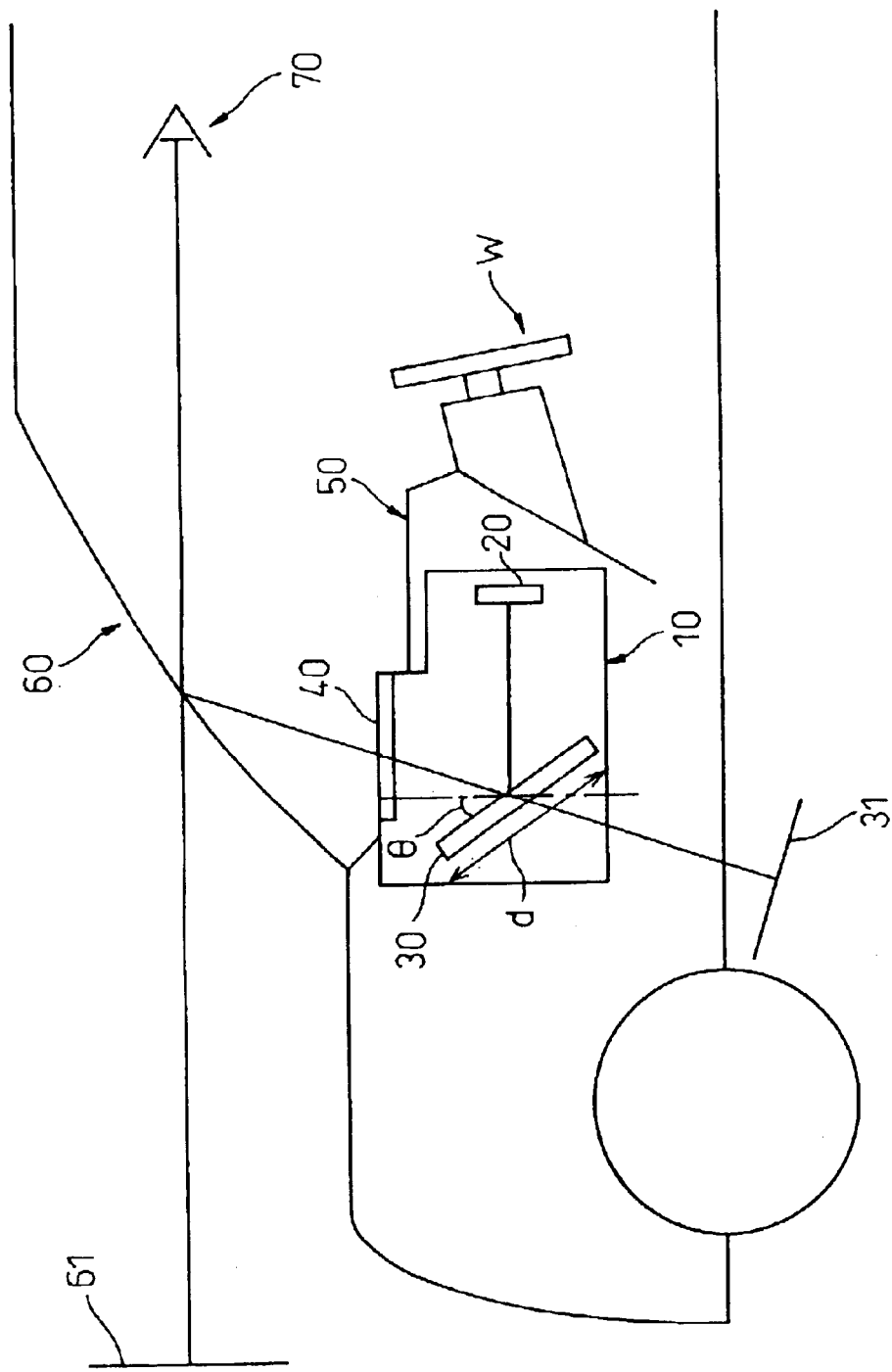
FIG. 27 is an explanatory diagram showing the configuration of a conventional head-up display.

FIG. 27 shows a conventional head-up display. An optical unit 10 is mounted on an installment panel 50 located in a vehicle compartment. The optical unit 10 consists mainly of a display device 20 such as a liquid crystal display or a CRT, a reflecting mirror 30 such as a concave mirror, and a dustproof cover 40. Light emitted from the display device 20 is reflected from the reflecting mirror 30, and falls on a windshield 60 through the dustproof cover 40 laid over an opening of the optical unit. The incident light is reflected from the windshield 60, whereby display information is presented as a virtual image 61 formed ahead of the windshield 60. The reflecting mirror 30 having a width d is tilted by an angle θ with respect to a vertical direction.

Figure 28:
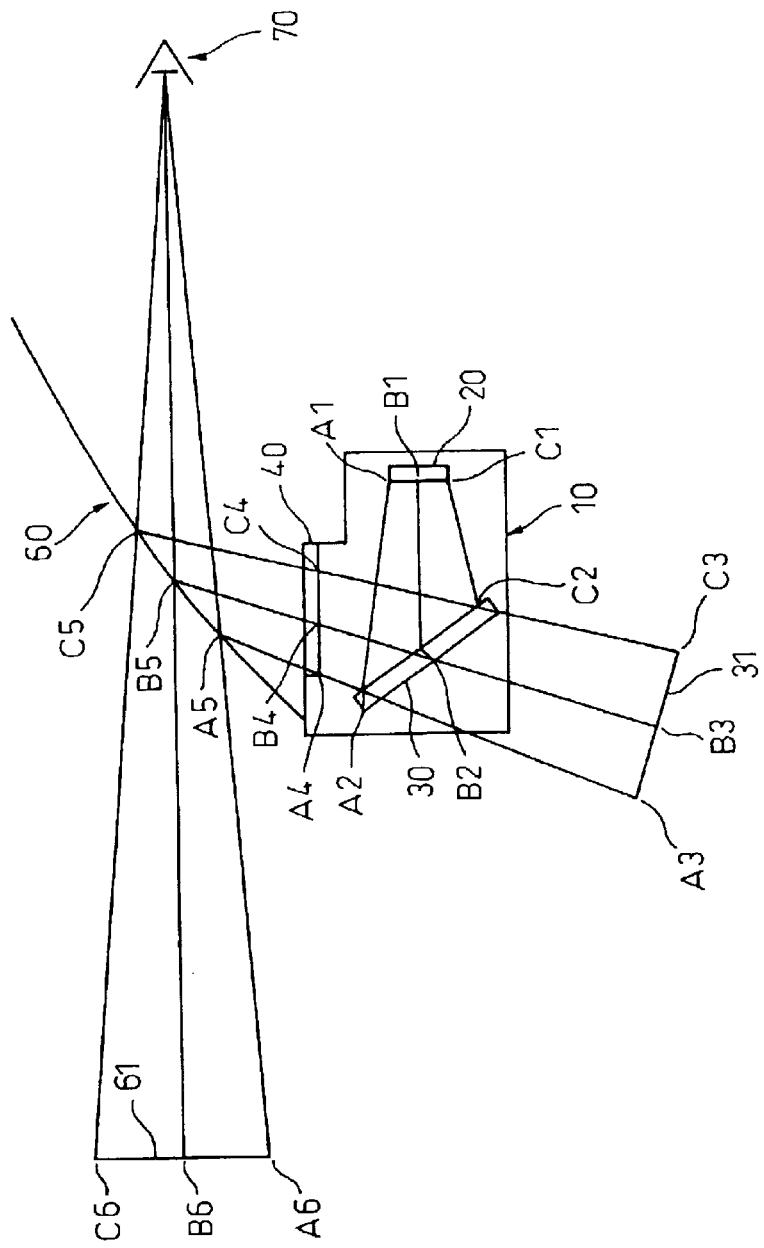
FIG. 28 is an explanatory diagram showing light rays traveling in the head-up display shown in FIG. 27.

FIG. 28 shows the optical unit 10 and windshield 60 shown in FIG. 27 together with light rays. Light emitted from the center point B1 in the display device 20 reflects at a point B2 on the reflecting mirror 30, passes through a point B4 in the dustproof cover 40, and is reflected at a point B5 on the windshield 60. The light then travels towards an observer's eye 70. A point B3 is a point at which a virtual image is formed by the reflecting mirror 30. A point B6 is a point at which a virtual image is formed by the windshield 60, that is, at which a virtual image is viewed from view point. FIG. 28 also shows the paths of light rays emitted from the edges A1 and C1 of the display device 20.

Assuming that a virtual image 61 formed ahead of a driver has a width d6 (distance from a point A6 to a point C6), the width of a light path at the reflecting mirror 30 is d2 (distance from a point A2 to a point C2). The width of a light path at the display device 20 is d1 (distance from the point A2 to the point C1). In order to increase the size of the virtual image 61 formed ahead of the driver, the width d2 of the light path at the reflecting mirror 30 and the width d1 of the light path at the display device 20 must be increased.

However, the optical unit 10 must be designed compactly so that it an be readily mounted on the installment panel 50.

Figure 1:
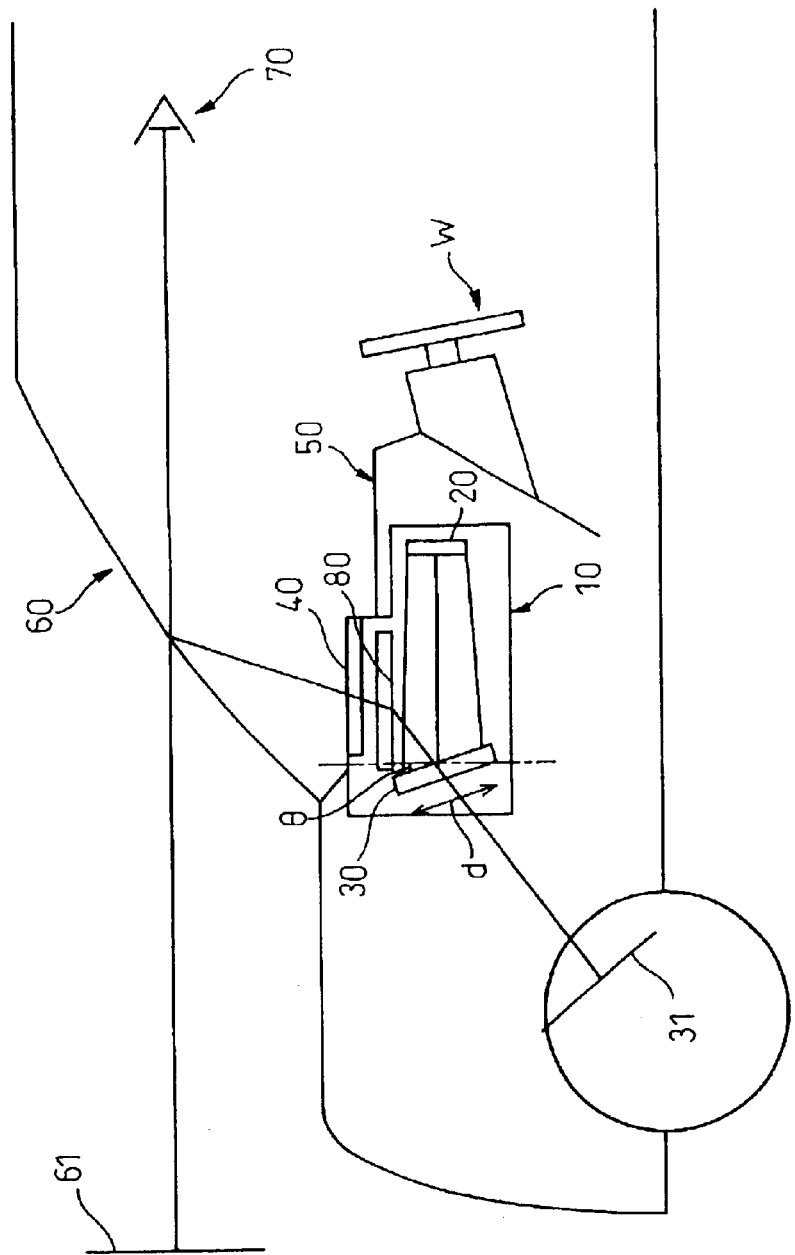
FIG. 1 is an explanatory diagram showing the configuration of a head-up display.
Figure 2:
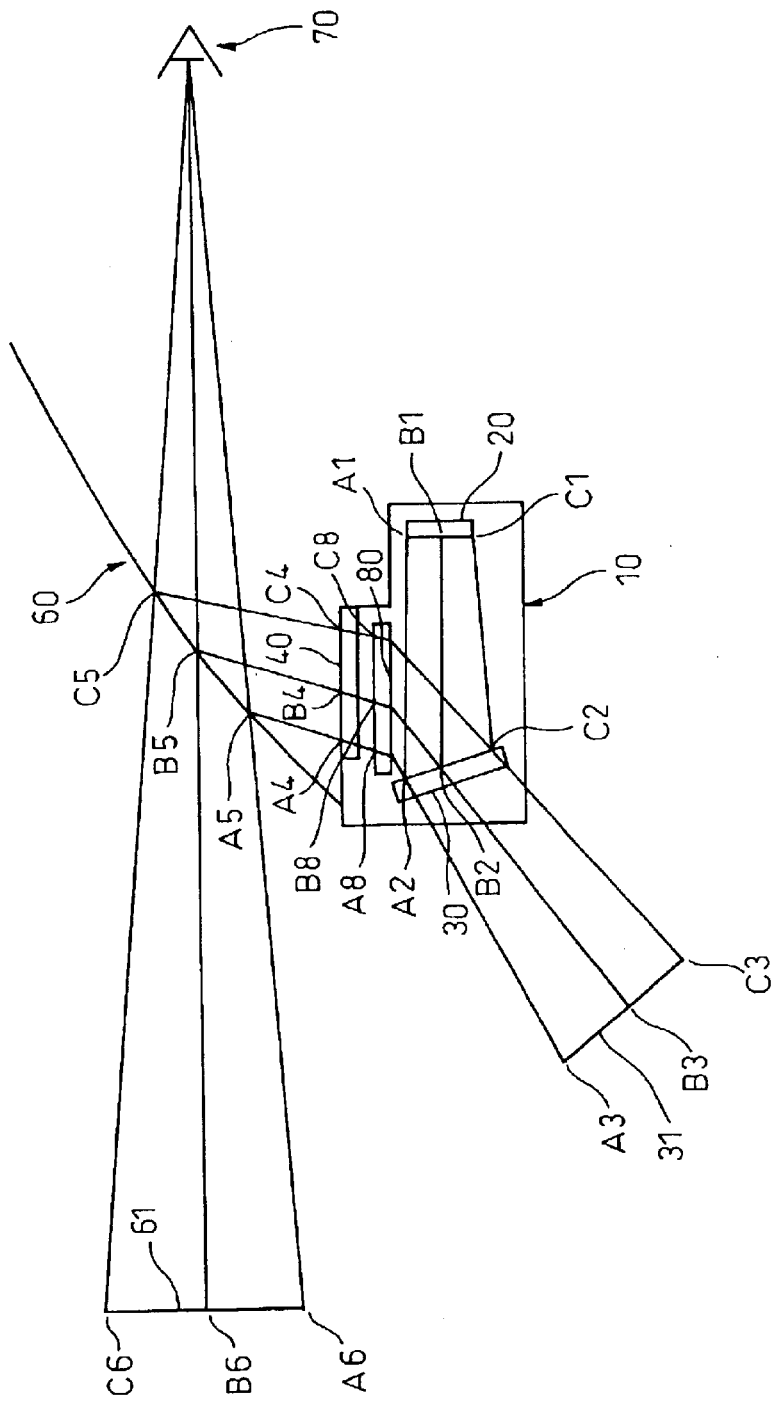
FIG. 2 is an explanatory diagram showing light rays in the head-up display shown in FIG 1.

Under these circumstances, a head-up display shown in FIG. 1 and FIG 2 has been devised. The head-up display comprises a display device 20, a reflecting mirror (concave mirror) 30, a dustproof cover 40, and a prism sheet 80. An opening of the optical unit 10 is covered with the dustproof cover 40 made of, for example, a transparent resin. The dustproof cover 40 may be mounted independently of the prism sheet 80 or the prism sheet 80 may also be used as the dustrpoof cover 40.

Figure 3:
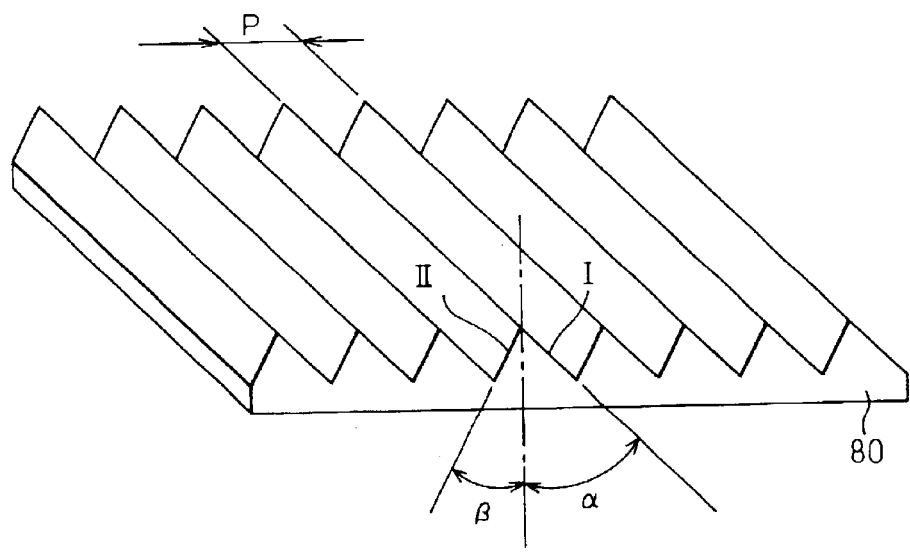
FIG. 3 is an explanatory diagram showing the structure of a prism sheet.

The structure of the prism sheet 80 will be described in conjunction with FIG. 3. The prism sheet 80 has one side of a transparent substrate, which is made of a plastic or glass made saw-toothed. Saw-toothed projections act as prisms. The plastic is composed of an acrylic and polycarbonate. The saw-toothed projections each have one surface inclined at an angle α and another surface inclined at an angle β. An angle α+β is called a vertical angle.

Figure 4:
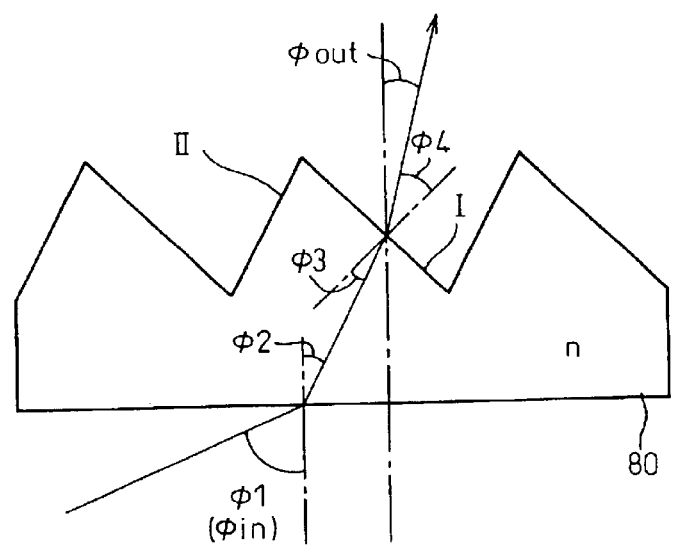
FIG. 4 is an explanatory diagram showing an optical operation of a prism sheet shown in FIG. 3.

Next, an optical operation of the prism sheet 80 will be described in conjunction with FIG. 4. Assuming that a refractive index offered by the prism sheet 80 is n and a refractive index offered by air is 1, the following relationship is established based on Snell's law:

$$\sin \phi_1 = n \times \sin \phi_2$$

$$n \times \sin \phi_3 = \sin \phi_4$$

Assuming that an angle of incidence with respect to a normal to the prism sheet 80 is φin and an angle of emergence is φout(°), the following relationship is established:

$$\phi out = 90 - \alpha - \arcsin(n \times \sin(90 - \alpha - \arcsin(\sin \phi in/n))) \quad (1)$$

When an angle α is determined appropriately, a light path that reaches the prism sheet at the angle of incidence φin can be bent to a light path that parts from the prism sheet at the angle of emergence φout.

Compared with the conventional head-up display shown in FIG. 27 and FIG. 28, the required width of the light path extending from the concave mirror 30 is reduced by a length expressed as follows:

$$\cos(\phi in)/\cos(\phi out)$$

Accordingly, the optical unit 10 can be designed compactly.

If the optical unit 10 has the same size as the one included in the conventional head-up display, the width d6 of a virtual image formed ahead of a driver is increased by a length expressed as follows:

$$\cos(\phi out)/\cos(\phi in)$$

Consequently, despite of the inclusion of the optical unit having the same size as the one included in the conventional head-up display, a larger-size image can be presented.

However, in this case, a drawback described below may ensue.

Figure 5:
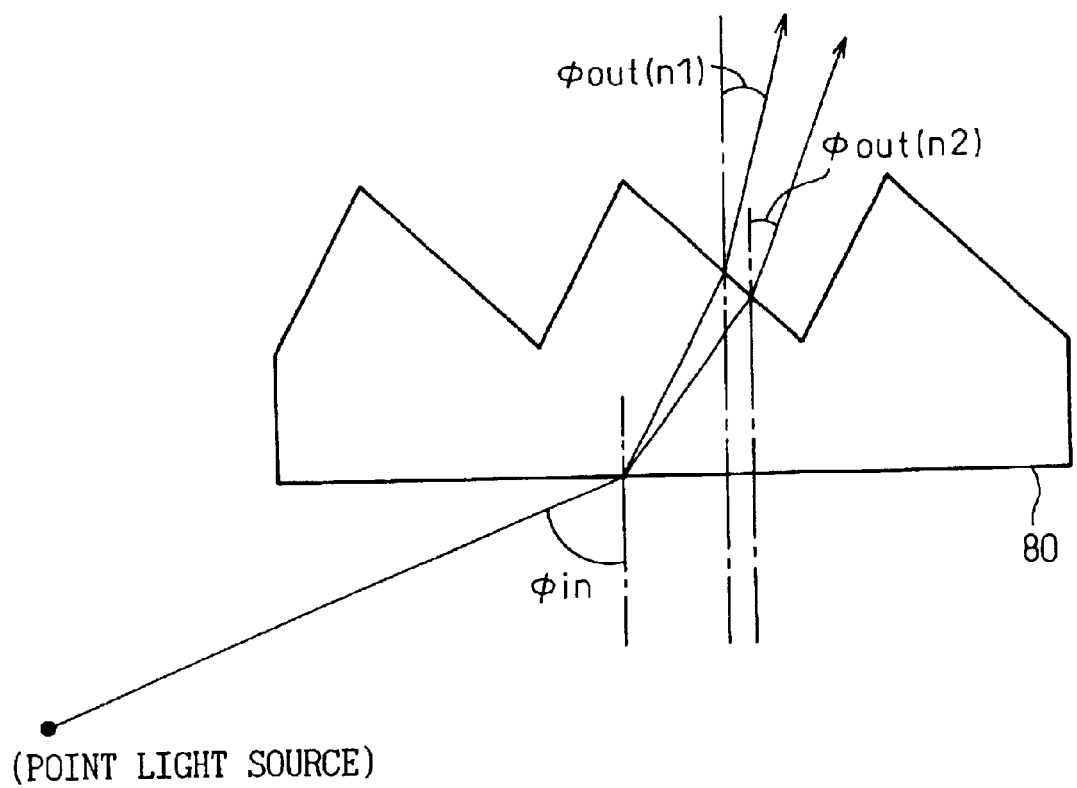
FIG. 5 is an explanatory diagram showing a difference between light paths stemming from a difference between wavelengths.

In general, a refractive index offered by a certain substance depends on the wavelength of light. The shorter the wavelength of light, the larger the refractive index. The equation (1) describing an angle of emergence φout at which light emerges from the prism sheet 80 contains a refractive index. Therefore, according to the equation (1), the angle of emergence φout varies depending on a wavelength. FIG. 5 shows this relationship. Light is emitted from a point light source. Assuming that a refractive index at which light having a certain wavelength λ1 is refracted is n1 and a refractive index at which light having a wavelength λ2 larger than the wavelength λ1 is refracted is n2, the angle of emergence is expressed as follows:

$$\phi out(n1) = 90 - \alpha - \arcsin(n1 \times \sin(90 - \alpha - \arcsin(\sin \phi in/n1)))$$

$$\phi out(n2) = 90 - \alpha - \arcsin(n2 \times \sin(90 - \alpha - \arcsin(\sin \phi in/n2)))$$

$$\phi out(n1) < \phi out(n2)$$

Figure 6:
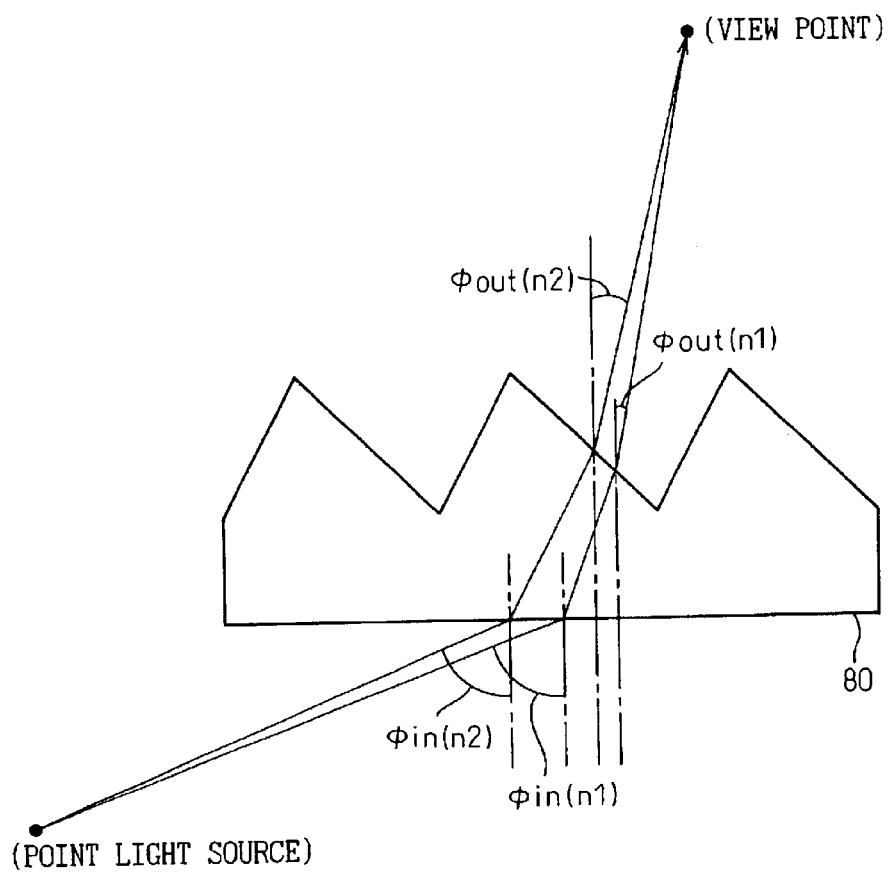
FIG. 6 is an explanatory diagram showing light emitted from a point light source and seen from the stationary position of an observer's eye.

Referring to FIG. 6, a description will be made of a case where light emitted from a point light source is seen from a fixed view point. A shorter wavelength and a larger refractive index bring about great refraction of light. A path of light from a point light source to the view point varies. Specifically, the relationships below are established.

$$\phi in(n1) > \phi in(n2)$$

$$\phi out(n1) < \phi out(n2)$$

At this time, images represented by light rays having different wavelengths are seen at different points from the position of an observer's eye.

Figure 7:
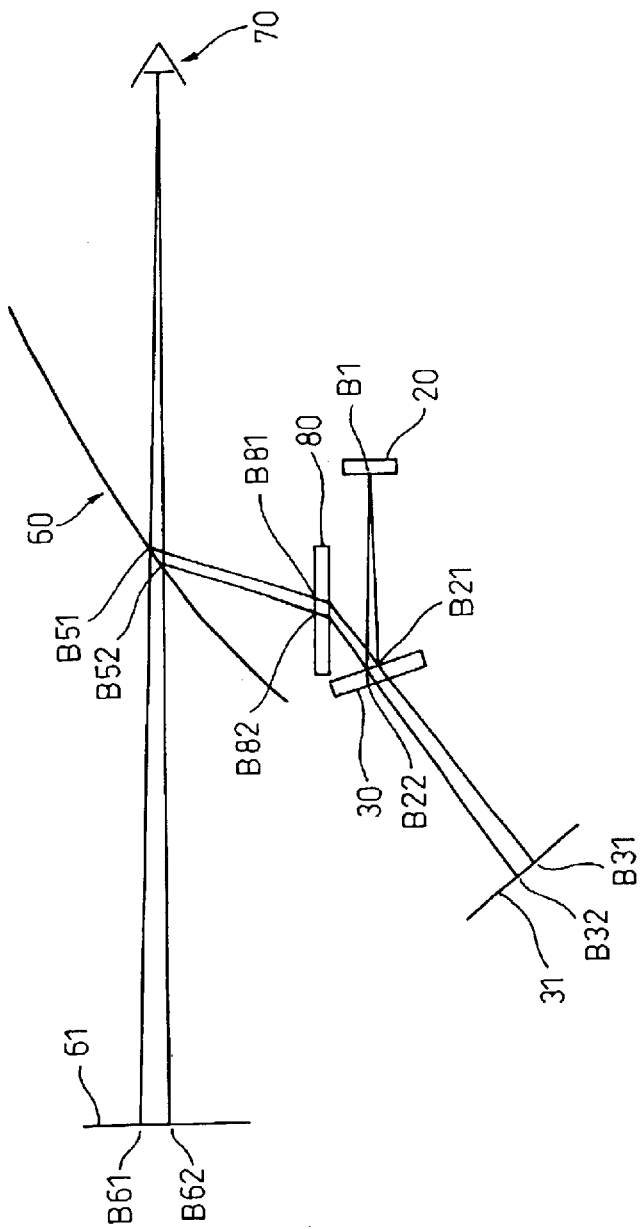
FIG. 7 is an explanatory diagram concerning a display image presented by the head-up display including an optical unit that has a prism sheet.

Now, referring to FIG. 7, a description will be made of a display image presented by the head-up display including the optical unit 10 that has the prism sheet 80.

Assuming that light has a short wavelength λ1 and is refracted at a large refractive index, a light ray emitted from a center point B1 in the display device 20 is reflected at a point B21 on the concave mirror 30, and passes through a point B81 in the prism sheet 80. The light then passes a point B51 on the windshield 60 and reaches a view point 70. A formed virtual image is seen at a point B61. Likewise, assuming that light has a long wavelength λ2 and is refracted at a small refractive index, a light ray emitted from the center point B1 in the display device 20 is reflected at a point B22 on the concave mirror 30, and passes through a point B82 in the prism sheet 80. The light then passes a point B52 on the windshield 60, and reaches the view point. A formed virtual image is seen at a point B62. In other words, a picture displayed at the center point B1 in the display device 20 is projected to the different points B61 and B62 as different display images. When this phenomenon occurs, if the magnitude of separation between the points B61 and B62 is larger than a portion of a virtual image corresponding to one display line, portions of the virtual image corresponding to adjoining display lines are superposed on each other. This leads to a drastic deterioration in display quality. In contrast, when the magnitude of separation between the points B61 and B62 is smaller than the portion of the virtual image corresponding to one display line, if the magnitude of separation is smaller than the resolution offered by the eyes, deterioration in display definition can be prevented.

Referring to the drawings, first to third embodiments in which the present invention is implemented will be described below. Incidentally, the embodiments are not limited to the examples presented below. Needless to say, the present invention can be embodied in various forms as long as the forms fall within the technological scope of the present invention.

FIRST EXAMPLE

An example of the first embodiment of the present invention will be described in conjunction with FIG. 1, FIG. 2, FIG. 8, and FIG. 9. FIG. 1 shows a case where a head-up display according to the present invention is adapted for a motorcar.

The head-up display includes an optical unit 10. The optical unit 10 includes a display device 20, a reflecting mirror (concave mirror) 30, and a prism sheet 80. A dustproof cover 40 made of, for example, a transparent resin is laid over an opening formed in the optical unit 10. The dustproof cover 40 may be mounted independently of the prism sheet 80 or the prism sheet 80 may be used as the dustproof cover 40.

Light emitted from the display device 20 is reflected from the concave mirror 30, and refracted through the prism sheet 80. The light is then incident on a windshield 60. When the incident light is reflected by the windshield 60, the windshield 60 presents display information (picture information) as a virtual image 61 formed ahead of a vehicle. Herein, the concave mirror 30 has a width d, and is tilted by an angle θ with respect to a vertical direction.

Herein, the structure of the prism sheet 80 and the optical operation thereof are identical to those described previously.

In order to prevent deterioration in display definition of a virtual display image seen from the view point, a difference between angles of view attained when light rays having different wavelengths and being emitted from the same point in the display device 20 are incident on the observer's eye, or in other words, $|\phi out(n1)-\phi out(n2)|$ should be smaller than an angle of view subtended by a portion of a virtual image corresponding to one display line. More preferably, $|\phi out(n1)-\phi out(n2)|$ should be smaller than the resolution offered by the eyes.

Figure 8:
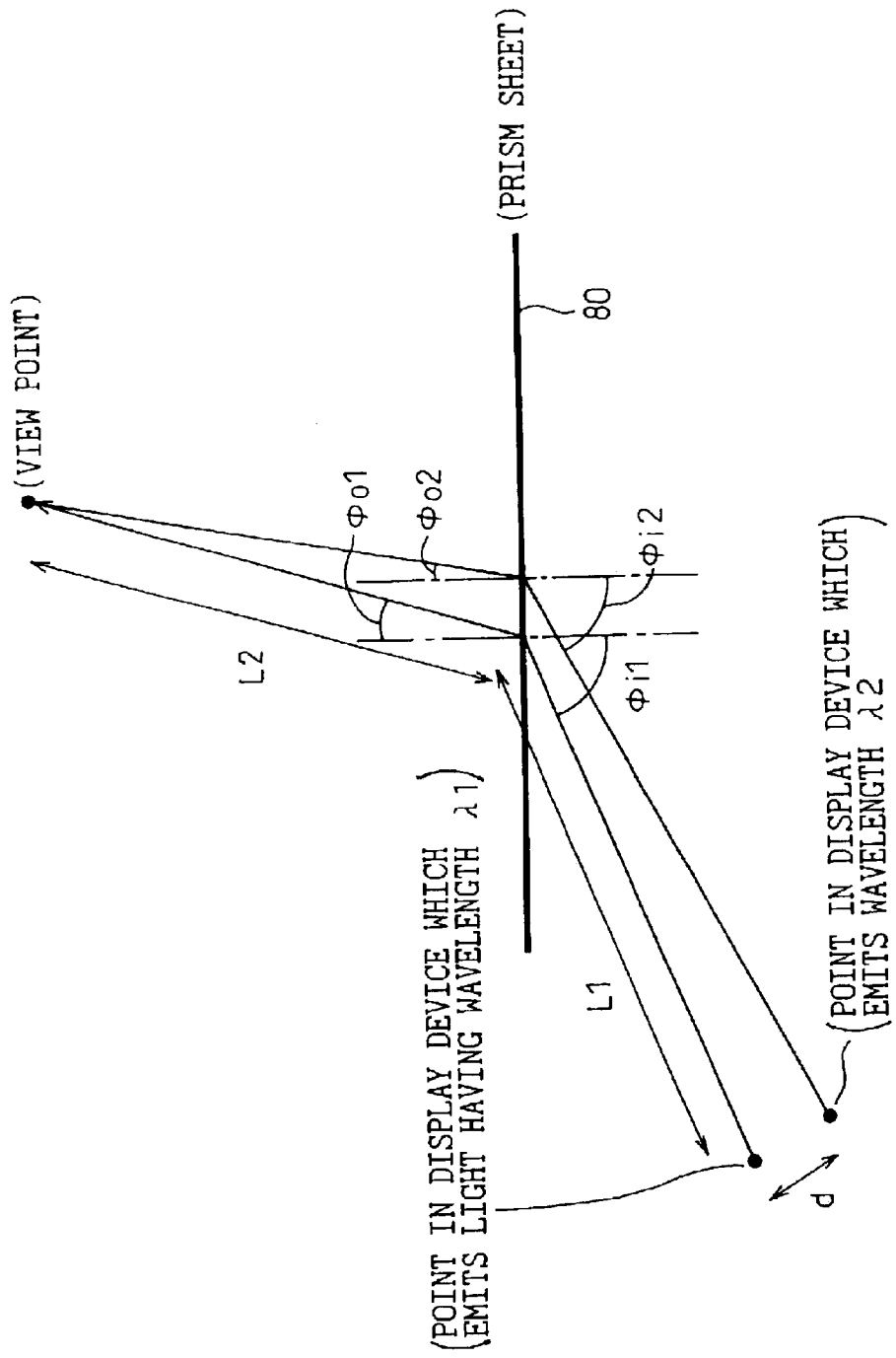
FIG. 8 is an explanatory diagram concerning a distance d.

The first embodiment that satisfies the above requirements will be described in conjunction with FIG. 8. A point in the display device 20 from which light having a wavelength $\lambda 1$ is emitted and a point therein from which light having a wavelength $\lambda 2$ are made different from each other by a distance d in advance. Assuming that a distance from the display device 20 to the prism sheet 80 is L1 and a distance from the prism sheet 80 to the observer's eye is L2, the following relationship is established:

$$d = L1 \times |\phi i1-\phi i2| \times |\phi o1-\phi o2| \times (\cos \phi i1/\cos \phi o1) \quad (2)$$

Incidentally, L1 may be a distance between a virtual image of the display device 20 formed by an optical element such as the concave mirror 30 and the prism sheet 80. At this time, $|\phi o1-\phi o2|$ is smaller than an angle of view subtended by a portion of a virtual image corresponding to one display line. For example, in order to project an image, which contains fifty display lines and has a height of 100 mm, at a position 2 m away from an observer's eye, $|\phi o1-\phi o2|$ should be equal to or smaller than 0.057° calculated as follows:

$$\text{arc } \tan(100/50/2000) = 0.057°$$

More preferably, $|\phi o1-\phi o2|$ should be smaller than the resolution of the eyes. According to "Optical Design for Visual Systems" (SPIE Press, P.8), the resolution offered by the eyes is calculated as follows:

$$\text{arc } \tan(1/7.4/254) = 0.030°$$

Therefore, $|\phi o1-\phi o2|$ should be equal to or smaller than 0.030°.

Figure 9:
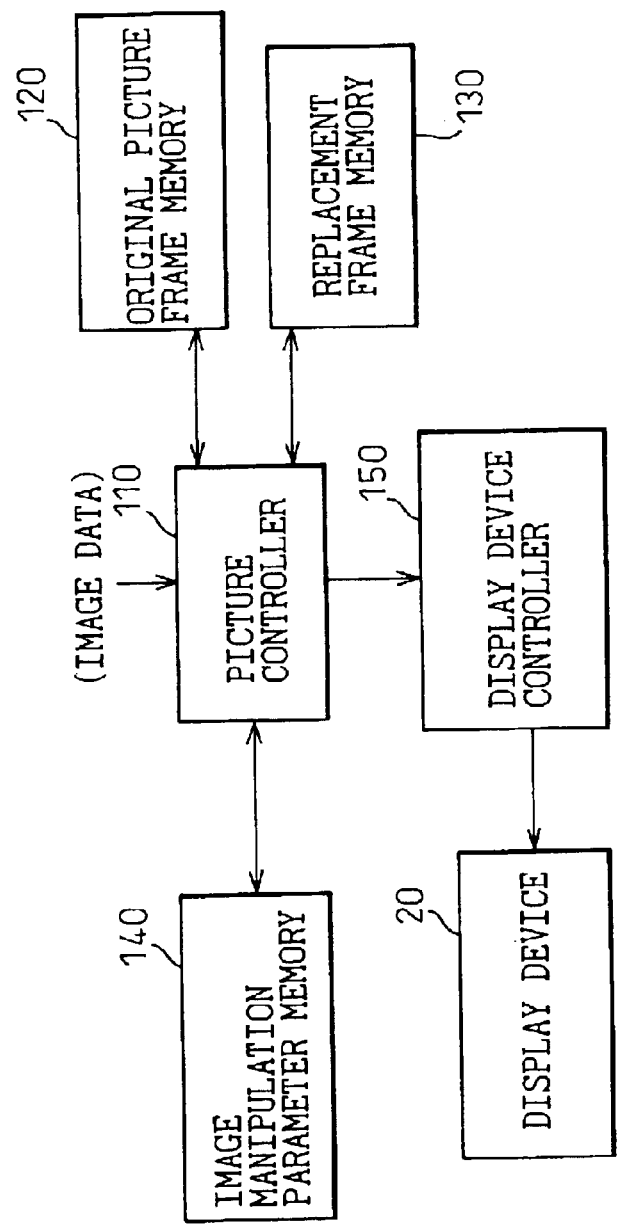
FIG. 9 is a block diagram showing the configuration of an image manipulation circuit that serves as a signal generator.

Next, a technique for separating images from each other by a distance d that satisfies the formula (2) will be described in conjunction with FIG. 9. FIG. 9 shows the configuration of an image manipulation circuit serving as a signal generator capable of separating image data items from each other by the distance d. The image manipulation circuit comprises a picture controller 110, an original image frame memory 120, a replacement frame memory 130, an image manipulation parameter memory 140, and a display device controller 150.

The picture controller 110 stores received image data in the original image frame memory 120. Thereafter, the picture controller 110 reads the image data from the original image frame memory. A displayed position conversion table is used to separate by a distance d a pixel, which is stored in the image manipulation parameter memory 140 and which specifies emission of light having a wavelength $\lambda 1$, from a pixel thereof specifying emission of light having a wavelength $\lambda 2$. Thus, the displayed position of an image represented by the pixel specifying emission of the light having the wavelength $\lambda 1$ and the displayed position of an image represented by the pixel specifying emission of the light having the wavelength $\lambda 2$ are converted, and stored in the replacement frame memory 130. Thereafter, the image data is read from the replacement frame memory 130, and transmitted to the display device controller 150. Based on the data, the display device controller 150 transmits a signal to the display device 20. According to the signal, an image is displayed on the display device 20. The displayed position conversion table is produced in advance based on the spectral distribution characteristic of light emitted from the display device 20.

Examples of the foregoing components will be described below. A liquid crystal display that emits light rays whose wavelengths are within three ranges and whose center wavelengths are 490, 545, and 610 nm respectively is adopted as the display device 20. The prism sheet 80 is made of PMMA, and offers refractive indices of 1.495, 1.492, and 1.489 respectively for the respective wavelength ranges. An inclination α is set to 45°. An angle of incidence α at which light having the wavelength of 490 nm incidents on the prism sheet 80 is set to 60.0°. Moreover, a length L1 is set to 1 m and a length L2 is set to 1 m. An angle of emergence $\phi o$ is calculated according to the equation (1). In order to satisfy $|\phi o1-\phi o2| \leq 0.030°$ under these conditions, a distance d by which light having the wavelength of 545 nm should be made different from light having the wavelength of 490 nm comes to 5.45 mm. Moreover, the distance d by which light having the wavelength of 610 nm should be made different from light having the wavelength of 490 nm comes to 9.68 mm.

When the virtual image of the liquid crystal display formed by lights through the prism sheet is viewed from the position of an observer's eye, if the display images are not made different from each other, colors specific to the wavelength ranges are disjoined from each other. Consequently, an incorrectly colored and blurred image is viewed.

In contrast, when the displayed positions from which light rays having different wavelengths are emitted are made different from each other by the distance d meeting the above conditions, neither incorrect coloring nor blurring is discerned.

Consequently, while the optical unit 10 is designed compactly, a head-up display capable of displaying a large-size virtual image far away without deterioration in display definition can be realized.

SECOND EXAMPLE

Figure 10:
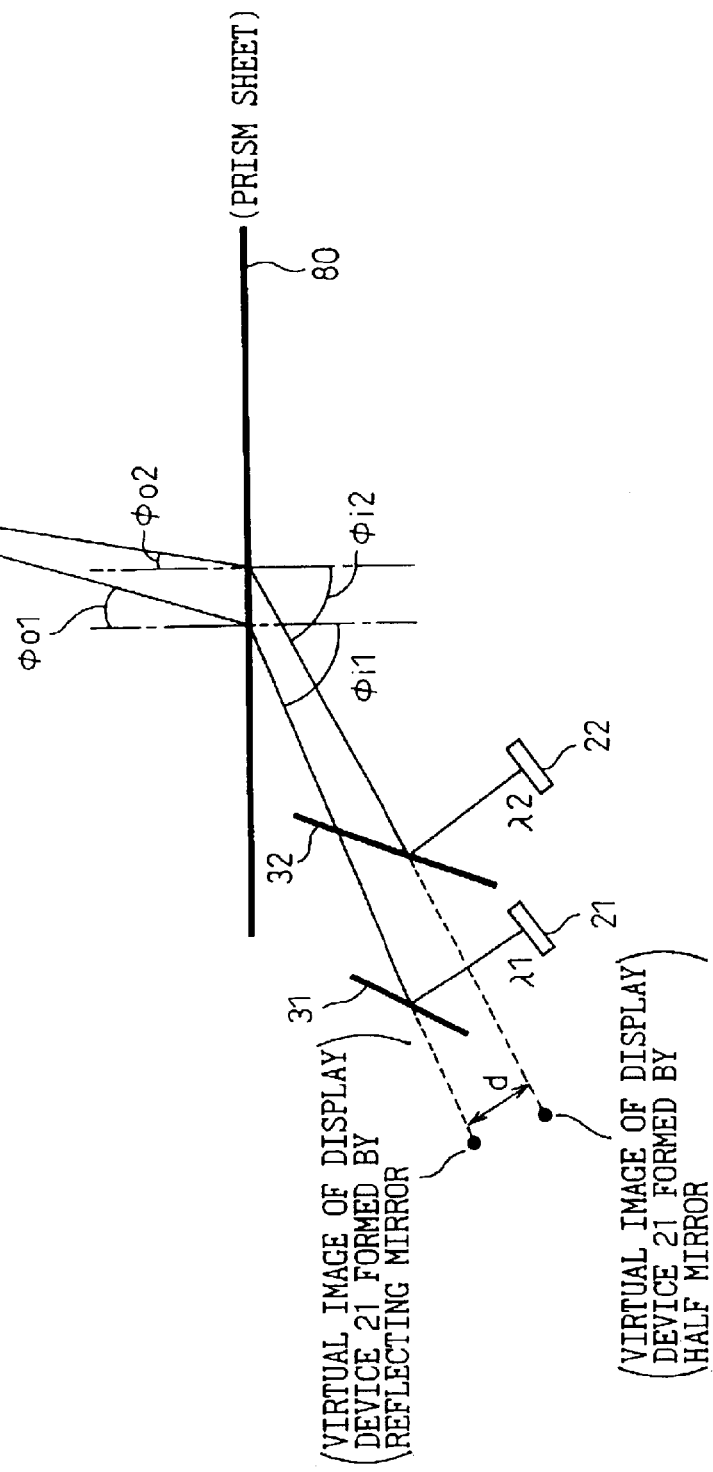
FIG. 10 shows a head-up display of a second example and light rays.

The second example has the same advantages as the first example while employing a plurality of display devices. Referring to FIG. 10, the second example will be described below.

Referring to FIG. 10, an optical unit includes a display device 21 on which an image that emits light having a wavelength $\lambda 1$ is displayed and a display device 22 on which an image that emits light having a wavelength $\lambda 2$ is displayed. Furthermore, the optical unit includes a reflecting mirror 31 that reflects light emitted from the display device 21, and a half mirror 32 through which passes the light coming from the display device 21 and which reflects light coming from the display device 22. The display devices 21 and 22, reflecting mirror 31, and half mirror 32 are arranged so that a distance d between a virtual image of the display device 21 formed by the reflecting mirror 31 and a virtual image of the display device 22 formed by the half mirror 32 satisfy the equation (2) described in relation to the first example.

A liquid crystal display that emits light whose center wavelength is 490 nm is adopted as the display device 21. A liquid crystal display that emits light whose center wavelength is 545 nm is adopted as the display device 22. The prism sheet 80 is made of PMMA, and offers refractive indices of 1.495 and 1.492 for the respective wavelength ranges. An angle of incidence $\phi i1$ at which light having the wavelength of 490 nm is incident onto the prism sheet 80 is set to 60.0°. Moreover, a length L1 is set to 1 m and a length L2 is set to 1 m. An angle of emergence $\phi o$ is calculated according to the equation (1). In order to satisfy $|\phi o1-\phi o2| \leq 0.030°$ under these conditions, a distance d by which light having the wavelength of 545 nm should be made different from light having the wavelength of 490 nm comes to 5.45 mm.

When the virtual image of the liquid crystal display formed by lights through the prism sheet 80 is viewed from the view point, if the display images are not made different from each other, colors specific to the wavelength bands are disjoined from each other. Consequently, an incorrectly colored and blurred image is viewed.

In contrast, when the position of a virtual image of the display device 21 formed by the reflecting mirror 31 and the position of a virtual image of the display device 22 formed by the half mirror 32 are made different from each other by the distance d satisfying the above conditions, neither incorrect coloring nor blurring is discerned.

Thus, while the optical unit 10 is designed compactly, a head-up display capable of presenting a large-size virtual image far away without deterioration in display definition can be realized.

THIRD EXAMPLE

Figure 11:
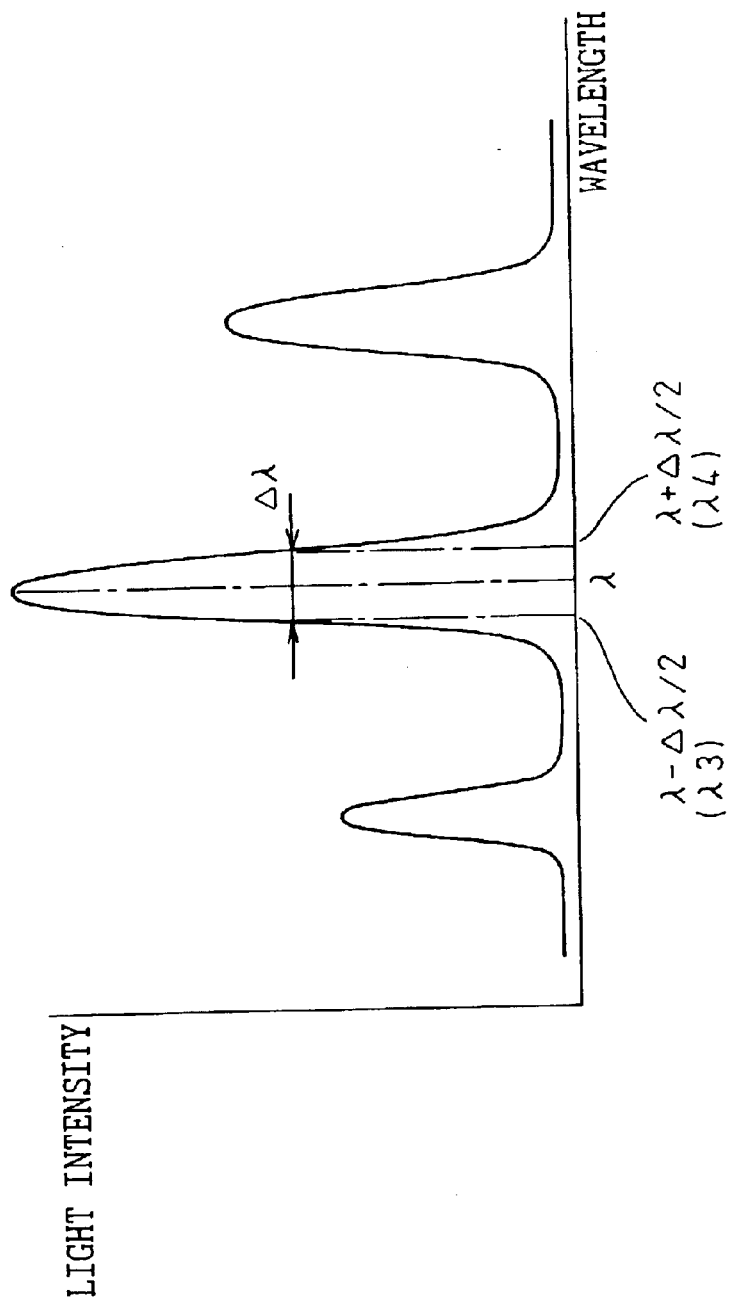
FIG. 11 is an explanatory showing a spectral energy distribution characteristic of light emitted from a display device.

The third example will be described in conjunction with FIG. 11 and FIG. 12. Light characteristics of the spectral distribution shown in FIG. 11 is emitted as light rays having different wavelengths from the display device 20 included in the first example. Referring to FIG. 11, light that is plotted as an acute curve in the center of FIG. 11 will be described as a typical example. The center wavelength of the light plotted as the acute curve is $\lambda$ and the half width of the acute curve is $\Delta\lambda$. The points on the curve determining the half width indicate wavelengths of $\lambda 3$ and $\lambda 4$ that are expressed as follows:

$$\lambda 3 = \lambda - \Delta\lambda/2$$

$$\lambda 4 = \lambda + \Delta\lambda/2$$

Figure 12:
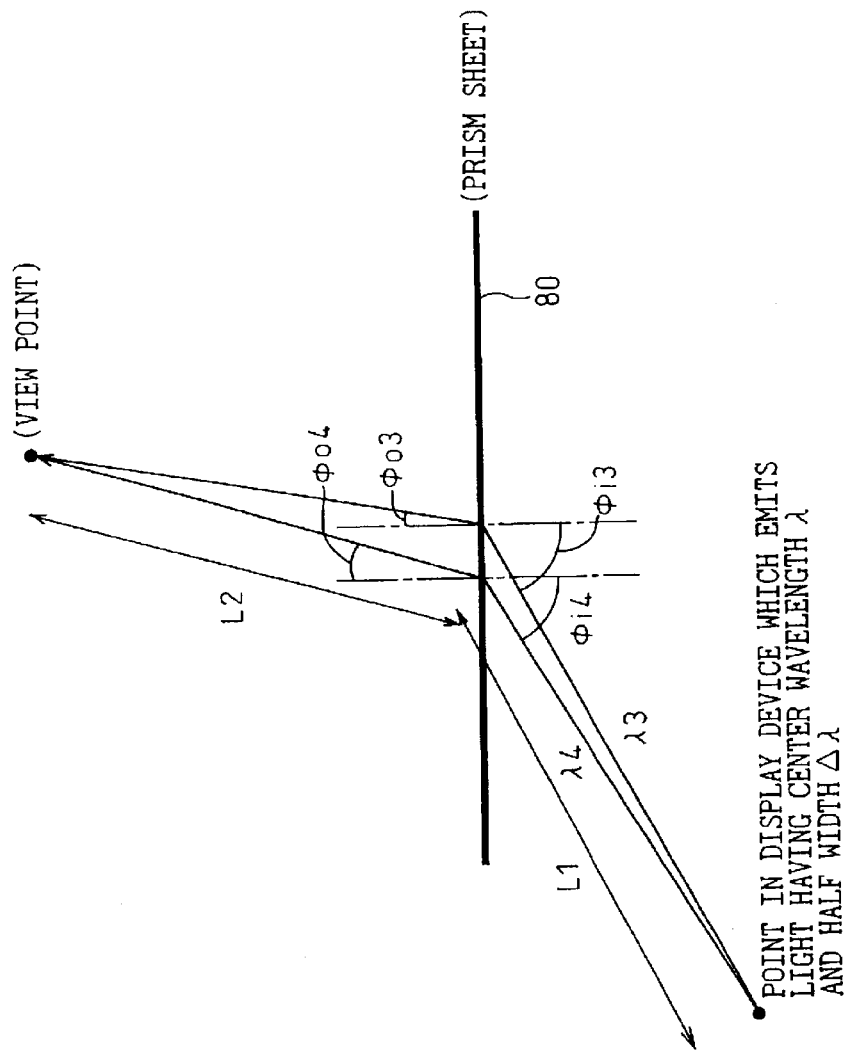
FIG. 12 is an explanatory diagram showing light rays traveling in a head-up display of a third example.

The light having the center wavelength $\lambda$ and the half width $\Delta\lambda$ travels, as shown in FIG. 12, between light having the wavelength of $\lambda 3$ and light having the wavelength of $\lambda 4$ and reaches a view point.

Assuming that an angle of incidence of the light having the wavelength $\lambda 3$ is $\phi i3$ and an angle of emergence thereof is $\phi o3$, an angle of incidence of the light having wavelength $\lambda 4$ is $\phi i4$ and an angle of emergence thereof is $\phi o4$, the distance between the display device and prism sheet 80 is L1, and the distance between the prism sheet 80 and observer's eye is L2, the following relationship is established:

$$\Delta\phi = |\phi o4 - \phi o3| = (L1/L2) \times (\cos \phi o3 / \cos \phi i3) \times |i4 - \phi i3| \quad (3)$$

When $\Delta\phi$ gets larger than an angle of view subtended by a portion of a virtual image corresponding to one display line, a portion thereof corresponding to an adjoining display line is superposed on the portion. This markedly deteriorates display definition. In contrast, when $\Delta\phi$ is smaller than the angle of view subtended by a portion of a virtual image corresponding to one display line, if $\Delta\phi$ is smaller than a resolution offered by the eyes, deterioration in display definition can be prevented.

A description will be made by taking for instance light whose center wavelength is 545 nm. The prism sheet 80 is made of PMMA, and offers a refractive index of 1.492 for the light. The inclination $\alpha$ of each of the prisms included in the prism sheet is 45°. An angle of incidence $\phi i3$ at which light having the wavelength $\lambda 3$ is incident on the prism sheet 80 is 60.0°. Moreover, the distances L1 and L2 are set to 1 m. An angle of emergence $\phi o$ of the light is calculated according to the equation (1). In order to satisfy $\Delta\phi = |\phi o4 - \phi o3| \leq 0.030°$ under these conditions, the wavelengths $\lambda 3$ and $\lambda 4$ are set to 536 nm and 554 nm respectively. In this case, the half width $\Delta\lambda$ of a curve expressing the light that has the wavelength of $\lambda 3$ is 18 nm.

When an image that is displayed on a liquid crystal display serving as the display device 20 and that emits light whose center wavelength is 545 nm is seen through the prism sheet 80 from the position of an observer's eye, neither incorrect coloring nor blurring is observed.

Thus, while an optical unit is designed compactly, a head-up display capable of presenting a large-size virtual image far away without deterioration in display definition can be realized.

As mentioned above, in order to prevent deterioration in the display definition of a virtual image seen from the view point 70, a difference between angles of view attained when light rays having different wavelengths and being emitted from the same point in the display device 20 is incident on the view point, or in other words, |φout(n1)−φout(n2)| shown in FIG. 6 should be smaller than an angle of view subtended by a portion of the virtual image 61 corresponding to one display line. More preferably, |φout(n1)−φout(n2)| should be smaller than a resolution offered by the eyes.

The second embodiment satisfying the foregoing requirements will be described in conjunction with FIG. 13 to FIG. 18.

Figure 13:
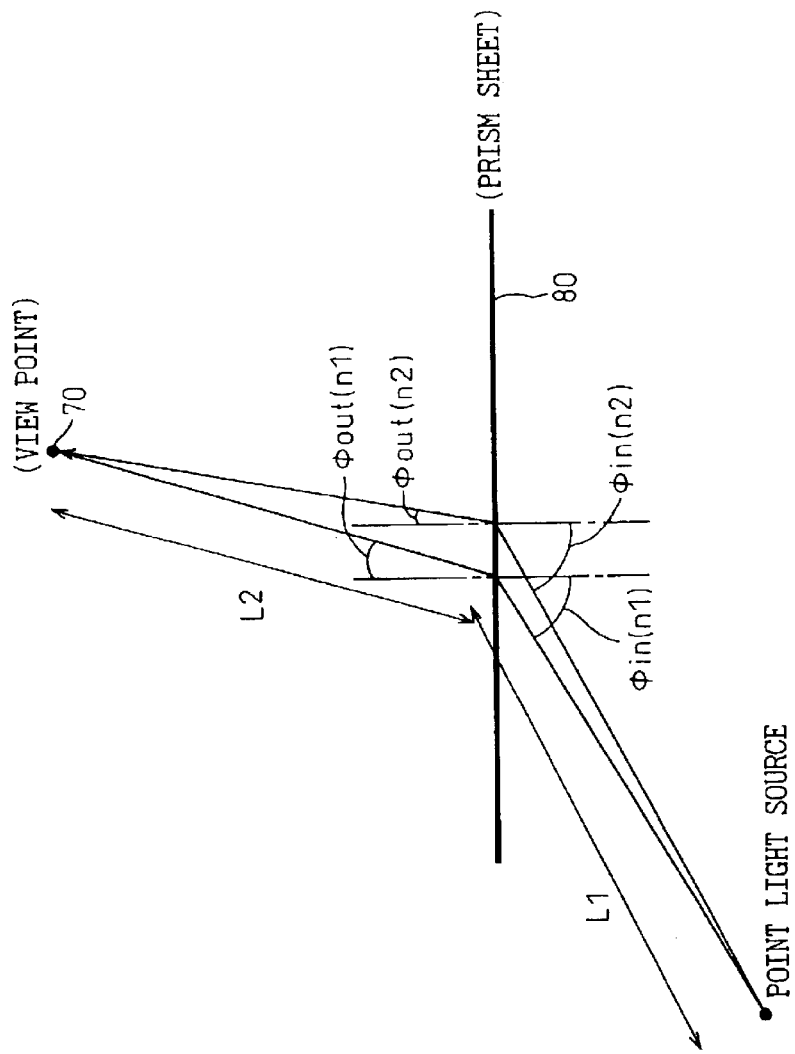
FIG. 13 shows paths along which two light rays having different wavelengths travel from a point light source to an observer's eye through a prism sheet.

A case where two light rays having different wavelengths reach, as shown in FIG. 13, the view point 70 through a prism sheet 80 from a point source will be discussed below. At this time, the length of a light path between a point light source and the prism sheet 80 shall be L1, and the length of a light path between the prism sheet 80 and the observer's eye 70 shall be L2. An angle of incidence of light that is refracted at a refractive index n2 and an angle of emergence thereof shall be φin(n2) and φout(n2) respectively. Moreover, Δφin=|φin(n1)−φin(n2)|, Δφout=|φout(n1)−φout (n2)|, and n1<n2 is satisfied. In this case, the following relationship is established:

$$L1 \times \tan(\Delta\phi in)/\cos(\phi in(n1)) = L2 \times \tan(\Delta\phi out)/\cos(\phi out(n1)) \quad (4)$$

Figure 14:
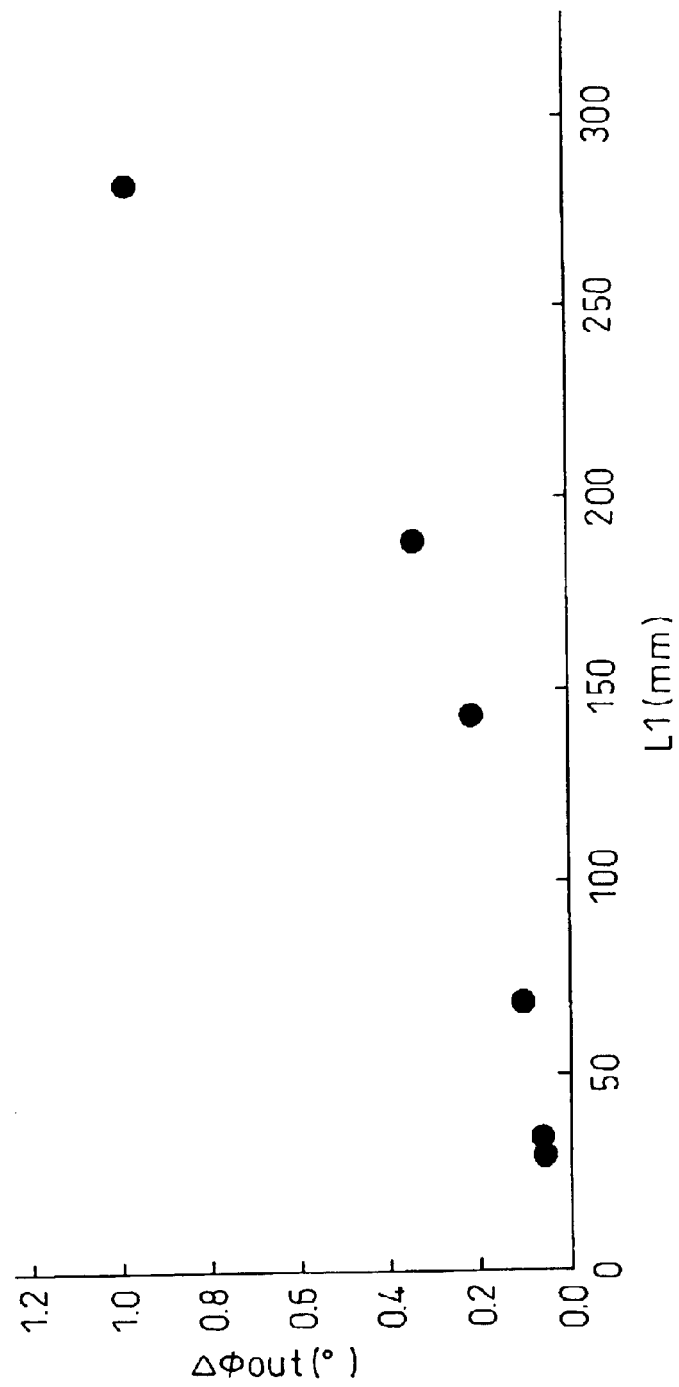
FIG. 14 is a graph indicating $\Delta\phi out$ in relation to a distance L1 from the point light source to the prism sheet.

FIG. 14 is a graph indicating Δφout=|φout(n1)−φout(n2)|, which is derived from the equation (4), as a function of the length L1. Herein, L2 denotes 1000 mm, n1 denotes 1.489, n2 denotes 1.495, φin(n1) denotes 60°, and φout(n1) denotes 30.6°. As apparent from FIG. 14, the smaller the length L1 is, that is, the nearer to the prism sheet 80 the point light source shown in FIG. 13 is, the smaller Δφout is. Incidentally, L1 may denote the distance between a virtual image of the display device 20 formed by an optical element such as a concave mirror and the prism sheet 80. At this time, |φout(n1)−φout(n2)| is smaller than an angle of view subtended by a portion of the virtual image corresponding to one display line. For example, when an image containing 50 display lines and having a height of 100 mm is projected to a position 2 m away from the observer's eye 70, Δφout= |φout(n1)−φout(n2)| should be equal to or smaller than 0.057° that is calculated as follows:

$$\text{arc } \tan(100/50/2000) = 0.057°$$

More preferably, Δφout=|φout(n1)−φout(n2)| should be equal to or smaller than a resolution offered by the eyes. According to "Optical Design for Visual Systems" (SPIE Press, P.8), the resolution offered by the eyes is calculated as follows:

$$\text{arc } \tan(1/7.4/254) = 0.030°$$

Δφout=|φout(n1)−φout(n2)| should therefore be equal to or smaller than 0.030°.

Figure 15:
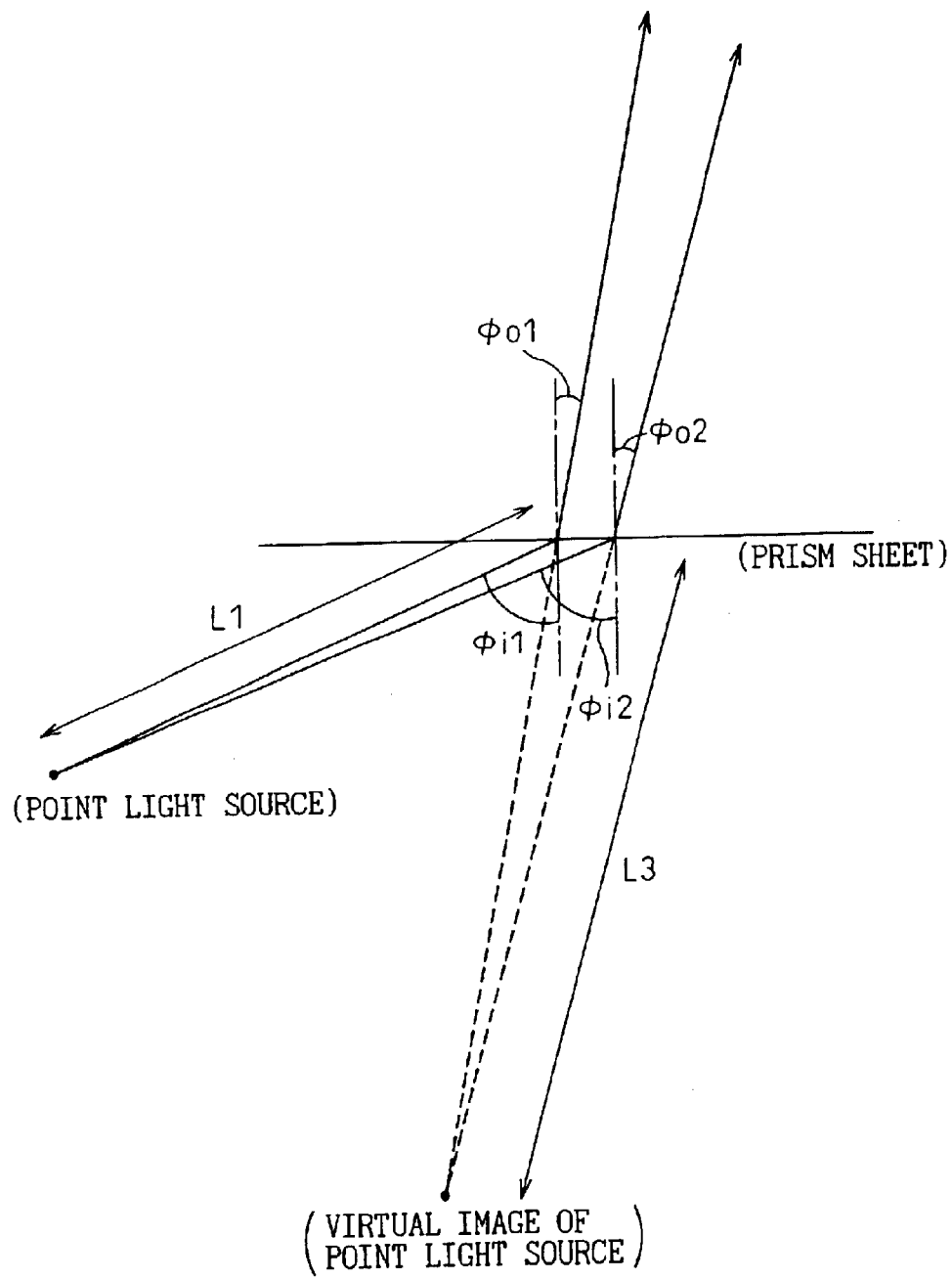
FIG. 15 is an explanatory diagram concerning an imaging distance from the position of an observer's eye to an image of the point light source via the prism sheet.

Next, the imaging distance from the view point 70 to an image of a point light source seen through the prism sheet 80 will be discussed in conjunction with FIG. 15. Herein, the length of a light path between the point light source and the prism sheet 80 is L1, and the length of a light path between the prism sheet 80 and a virtual image of the point light source is L3. An angle of emergence of light that incidents onto on the prism sheet at an angle of incidence φi1 is φo1, and an angle of emergence of light that enters the prism sheet at an angle of incidence φi2 is φo2. Δφi=|φi1−φi2| and Δφo=|φo1−φo2| is satisfied. In this case, the following relationship is established:

$$L1 \times \tan(\Delta\phi i)/\cos(\phi i1) = L3 \times \tan(\Delta\phi o)/\cos(\phi o1) \quad (5)$$

Figure 16:
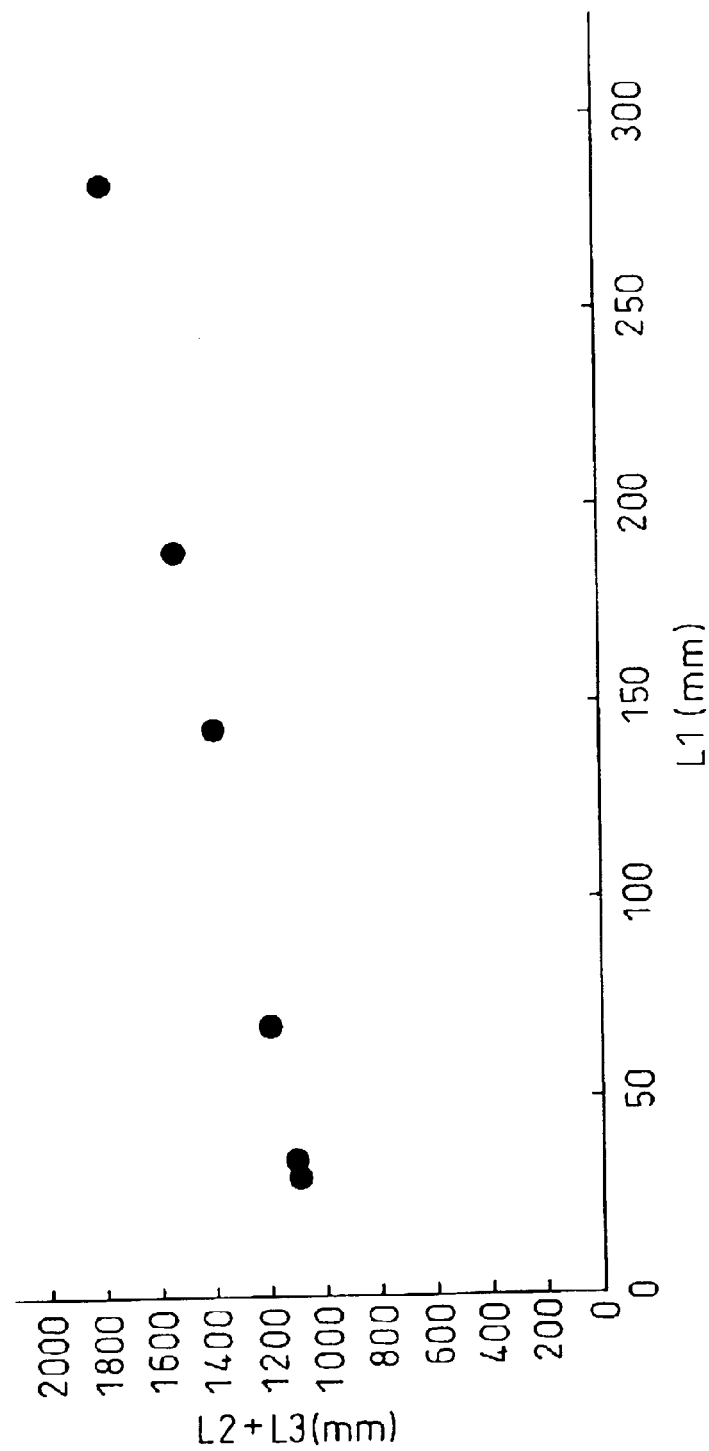
FIG. 16 is a graph indicating a distance (L2+L3) from the view point to the point light source in relation to a distance L1 from the point light source to the prism sheet.

The image of the point light source is formed at the position located at the distance L3 that is calculated from the equation (5). Assuming that the length of a light path between the observer's eye 70 and the prism sheet 80 is L2, the virtual image of the point light source is seen by a distance (L2+L3) away from the view point 70. FIG. 16 is a graph indicating (L2+L3) as a function of the length L1. Herein, the length L2 is 1000 mm.

In order to prevent deterioration in display definition, the length L1 must be reduced. However, when the length L1 is reduced, the distance (L2+L3) also decreases. That is to say, the distance to an image seen from the position of the observer's eye 70 is shortened. This contradicts the idea of presenting an image far away. Both the ideas of preventing deterioration in display definition and of presenting an image far away must be dealt with simultaneously.

Figure 17:
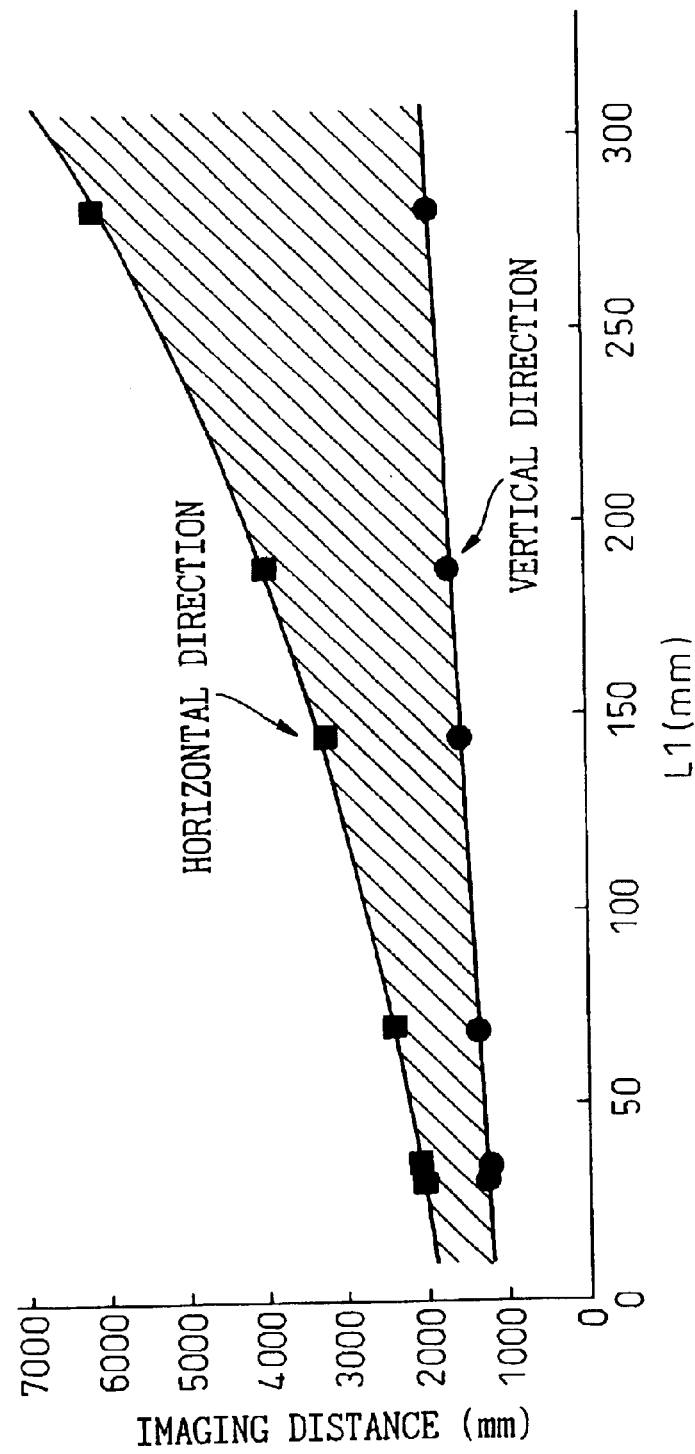
FIG. 17 is a graph indicating the position of an image in a direction vertical to the eyes and the position thereof in a direction horizontal thereto in relation to the distance L1 from the point light source to the prism sheet.

In general, when an observer sees an image with his/her eyes, the observer has a sense of distance through the convergence of the two eyes. In other words, the observer recognizes an imaging distance to an image in a direction horizontal to the eyes. If the distance to the image in the direction is long, the observer recognizes that the image lies far away. However, if the distance to an image is drastically different between the direction horizontal to the eyes and a direction vertical thereto, the observer may feel uncomfortable like in the case of car-sickness. This is a problem with the display. "Fundamentals of Three-dimensional Picture" (Ohmsha Co., Ltd., P.64) describes that as long as the difference between the distances to an image in the horizontal and vertical directions ranges from −0.2 D to +0.2 D (diopter or the reciprocal of a focal length in meters), that is, the range of the difference is 0.4 D, the observer does not feel much tired. Therefore, the position of an image in a direction horizontal to the eyes should be located farther than the position thereof in a direction vertical thereto. The difference between the positions should fall within the range of 0.4D. In this case, an observer will not feel tired, and not only display definition can be maintained but also an image can be presented far away. FIG. 17 is a graph indicating the position of an image in a direction vertical to the eyes and the position thereof in a direction horizontal thereto as functions of the distance L1 from the point light source to the prism sheet 80. Herein, the direction vertical to the eyes is parallel to a refracting surface of the prism sheet 80. Referring to FIG. 17, a hatched area denotes a domain within which the condition that the range of the difference between the positions in the horizontal and vertical directions should be 0.4 D is satisfied.

Next, an exemplary example of a head-up display capable of satisfying the above condition will be described in conjunction with FIG. 18. In this example, the head-up display comprises a display device 20, a lens 35, a reflecting mirror 30, and a prism sheet 80. As shown in FIG. 18, an X axis extends in a direction horizontal to the eyes and a Y axis extends in a direction vertical thereto. The lens 35 is a cylindrical lens exhibiting a curvature in the Y direction alone. The reflecting mirror 30 is a cylindrical mirror exhibiting a curvature in the X direction alone. Referring to FIG. 18, a length La is 50 mm, a length Lb is 150 mm, a length Ld is 28 mm, and a length Lc is 1000 mm. A focal length fy in the Y direction offered by the lens 35 is 37.5 mm, and a focal length fx in the X direction offered by the reflecting mirror 30 is 260 mm. In this structure, the distance to an image in the X direction is 1077 mm and the distance thereto in the Y direction is 1892 mm. In diopter, the distances in the X and Y directions are 0.93 D and 0.53 D respectively. The difference between the distances is 0.4 D. At this time, deterioration in image quality attributable to separation between light rays having different wavelengths (colors) is not observed. An image can be presented 1892 mm away from the view point 70. Moreover, an observer does not feel uncomfortable.

As mentioned above, according to the second embodiment of the present invention, while the optical unit 10 can be designed compactly, a head-up display capable of presenting a large-size virtual image far from the view point without deterioration in display quality and without a uncomfortable feeling can be realized.

Next, a third embodiment of the present invention will be described with reference to FIG. 19A to FIG. 26.

FOURTH EXAMPLE

As described with reference to FIG. 1 to FIG. 4, the employment of the prism sheet 80 permits realization of a compact optical unit 10. Referring to FIG. 2, light coming from the center point B1 in the display device 20 is reflect at the point B2 on the concave mirror 30, is refracted at the point B8 on the prism sheet 80, and passes through the point B4 in the dustproof cover 40. The light then is reflect at the point B5 on the windshield 60 and travels towards the view point 70. Herein, the point B3 coincides with the position of a virtual image formed by the concave mirror 30. The point B5 coincides with the position of a virtual image formed by the windshield 60, that is, the position of a virtual image seen from the position of the view point 70. The paths along which light rays travel from the edges A1 and C1 on the display device are also indicated.

Compared with the conventional head-up display shown in FIG. 27, assuming that the virtual image 61 formed ahead of a driver has the width d6 (distance between the points A6 and C6), the widths of the light paths extending from the windshield 80 and dustproof cover 40 respectively are identical to those in the conventional head-up display. However, the width d2 of a light path on the concave mirror 30 (distance between the points A2 and C2) is reduced by a length calculated as follows:

$$\cos(\phi in)/\cos(\phi out)$$

Owing to this advantage, the optical unit 10 can be designed compactly.

In contrast, when the optical unit 10 having the same size as the one included in the conventional head-up display is adopted, the width d6 of the virtual image 61 formed ahead of a driver is increased by a length calculated as follows:

$$\cos(\phi out)/\cos(\phi in)$$

Consequently, the optical unit has the same size as the one included in the conventional head-up display, and a larger-size image can be displayed.

A means for improving the image quality-related performance of the head-up display in accordance with a third embodiment of the present invention including the prism sheet 80 will be described in conjunction with FIG. 19 and FIG. 20.

Figure 19A:
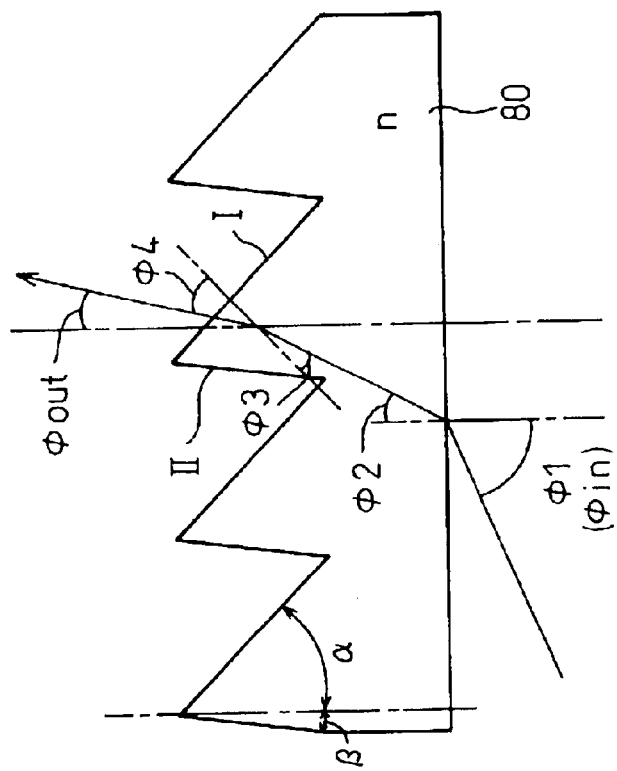
FIG. 19A and FIG. 19B are explanatory diagrams concerning the relationship between the direction of light passing through the prism sheet and an inclination of each prism.
Figure 19B:
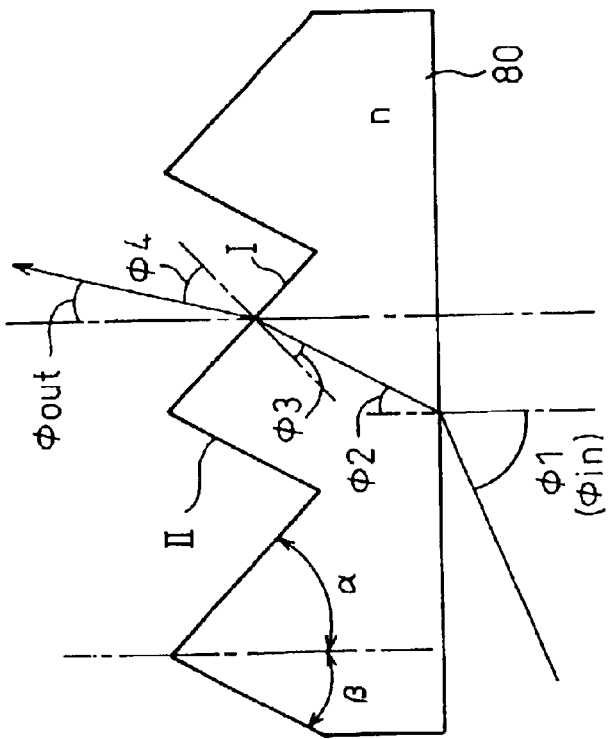
Figure 20:
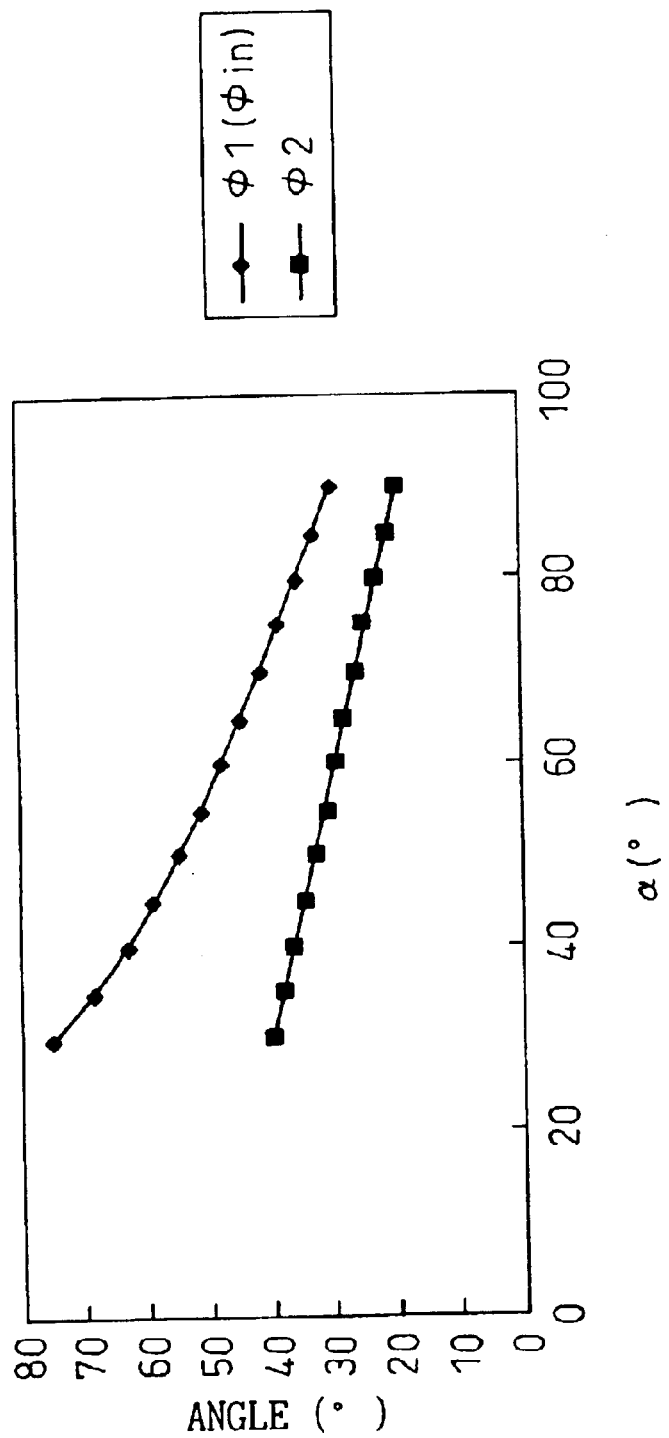
FIG. 20 is a graph indicating angles of incidence as functions of an angle at which light meets the internal surface of each prism in a case where the inclination of each prism is varied.

FIG. 20 is a graph indicating an angle of incidence $\phi in$ and an angle of refraction $\phi 2$ as functions of an inclination $\alpha$ of a surface I of each prism. Herein, an angle of emergence from the prism sheet $\phi out$ remains constant. The prism sheet 80 is made of an acrylic. The index of refraction n is 1.49, and the angle of emergence $\phi out$ is 30°. As seen from FIG. 20, the angle of incidence $\phi in$ permitting the angle of emergence $\phi out$ of 30° depends on the inclination $\alpha$ of the surface I. The angle $\phi 2$ at which light passes through each prism also varies depending on the inclination $\alpha$. When the inclination $\beta$ of a surface II and the angle $\phi 2$ at which light passes through each prism are different from each other as shown in FIG. 19B, the efficiency in utilizing light may be decreased, brightness may be degraded, or a display image may be blurred. Therefore, preferably, the inclination $\beta$ of the surface II and the angle $\phi 2$ at which light passes through each prism are identical with each other as shown in FIG. 19A. Thus, the inclination $\alpha$ of the surface I is differentiated from the inclination $\beta$ of the surface II, that is, each prism has an asymmetric shape. The inclination $\beta$ of the surface II is with the angle at which light passes through each prism, whereby deterioration in image quality is suppressed.

Figure 26B:
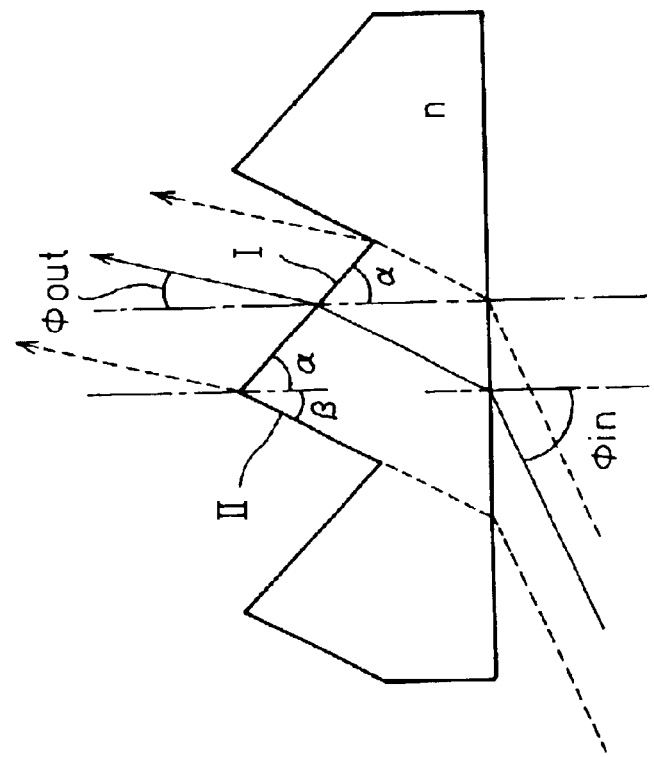
FIG. 26A and FIG. 26B show passage of light in a case where the vertical angle of each of prisms included in a prism sheet is axially symmetrical in comparison with passage of light in a case where the vertical angle is axially asymmetrical.
Figure 26A:
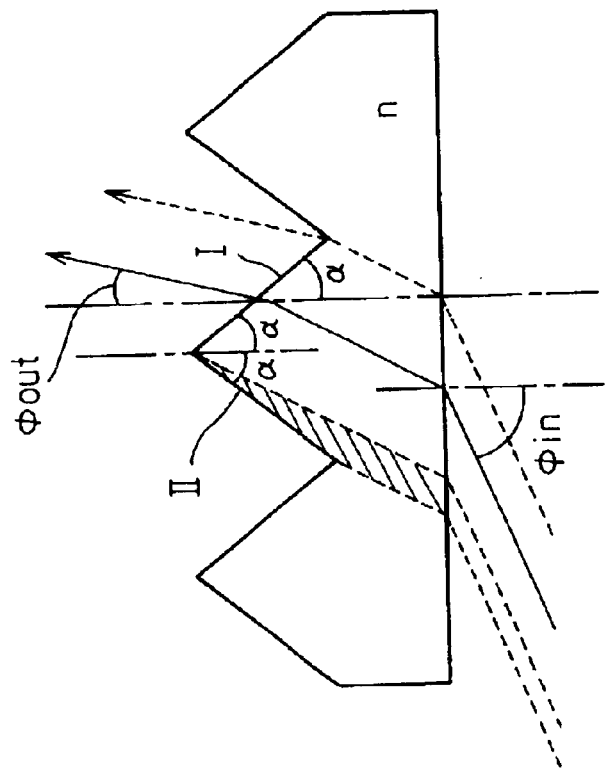

For example, a typical prism sheet having prisms each of whose vertical angle is, as shown in FIG. 26A, symmetrical to a normal to the surface of the prism sheet is employed, light does not pass through a portion of each prism shown as a hatched area in FIG. 26. Consequently, the efficiency in utilizing light decreases, and a display image is blurred. In order to minimize the portion, an inclined surface (surface II) of each prism other than a light emerging surface thereof is made parallel to an internal light path of each prism. Therefore, the vertical angle of each prism is made asymmetrical to a normal to the surface of the prism sheet.

Furthermore, the direction of inclination of the surface II of each prism is, as shown in FIG. 26B, made parallel to the direction of light passing through the prism. Consequently, the portion of each prism through which light does not pass and which is shown as a hatched part of FIG. 26A is minimized. The efficiency in utilizing light is therefore increased. The brightness of a display image (virtual image) is upgraded. Blurring of a display image can be suppressed. Thus, a virtual image that is easy for a user to see can be presented.

More preferably, the surface II is subjected to non-transmission finishing or scatter finishing, that is, finished not to pass light or finished to scatter light. In this case, light supposed to pass through the surface II is not passed through it or is scattered. Therefore, light passing through the surface I and intended to be utilized is not hindered. Thus, image quality is not adversely affected.

For example, when the prism sheet shown in FIG. 26B is employed, the surface I that is a light emerging surface is not finished at all, but the surface II that is the opposite side is subjected to non-transmission finishing or scatter finishing. That is to say, an inclined surface that is inclined in a direction substantially parallel to the direction of light passing through each prism is finished so as not to transmit light or to scatter light. Thus, adverse effects on image quality can be suppressed.

In order to perform non-transmission finishing, for example, a prism sheet may be coated with a resin that is hardened with ultraviolet light and that has a black pigment mixed therein. The prism sheet may then be masked so that ultraviolet light will be irradiated to the surfaces II alone. Otherwise, ultraviolet light may be obliquely irradiated to the prism sheet in order to harden the resin. Finally, an organic solvent may be used to wash away the resin that remains on the surfaces I and that is not hardened yet. However, the non-transmission finishing is not limited to this process. various processes are conceivable.

In order to form a certain image at the view point 70, an angle of view relative to the view point 70 must remain unchanged. For example, assume that an angle of view must remain unchanged irrespective of whether a prism sheet is not employed as shown in FIG. 21A or a prism sheet is employed as shown in FIG. 21B. In this case, an angle of incidence varies depending on a position on the prism sheet 80 in a direction of arrangement in which prisms are arranged. When the prisms included in the prism sheet 80 have an equal vertical angle, an angle of emergence varies slightly, depending on the position on the prism sheet 80. Consequently, an angle of view relative to the observer's eye varies. Therefore, the vertical angles of prisms located at points A8, B8, and C8 in FIG. 22, that is, the inclinations α of the surfaces I of the prisms are differentiated from one another. More particularly, assuming that the virtual image 61 has a length of 100 mm (distance between the points A3 and C3) and the distance between the observer's eye 70 and virtual image 61 is 1000 mm, the inclinations α of the surfaces I of the prisms included in the prism sheet 80 are changed from one another as listed in Table 1. The inclinations α of the surfaces I of other prisms are also calculated and determined in the same manner. Thus, the inclination of the surface I of each prism is varied depending on the position of the prism on the prism sheet. Consequently, the angle of view is optimized irrespective to the position on the prism sheet.

|  | A8 | B8 | C8 |
|---|---|---|---|
| Angle of incidence θin | 57.1 | 60.0 | 62.9 |
| Angle of emergence θo | 28.0 | 30.8 | 33.7 |
| Inclination α | 43.1 | 45.0 | 47.3 |

Unit: degree

FIFTH EXAMPLE

The fifth example is identical to the first example except that a prism sheet is movable.

Figure 23:
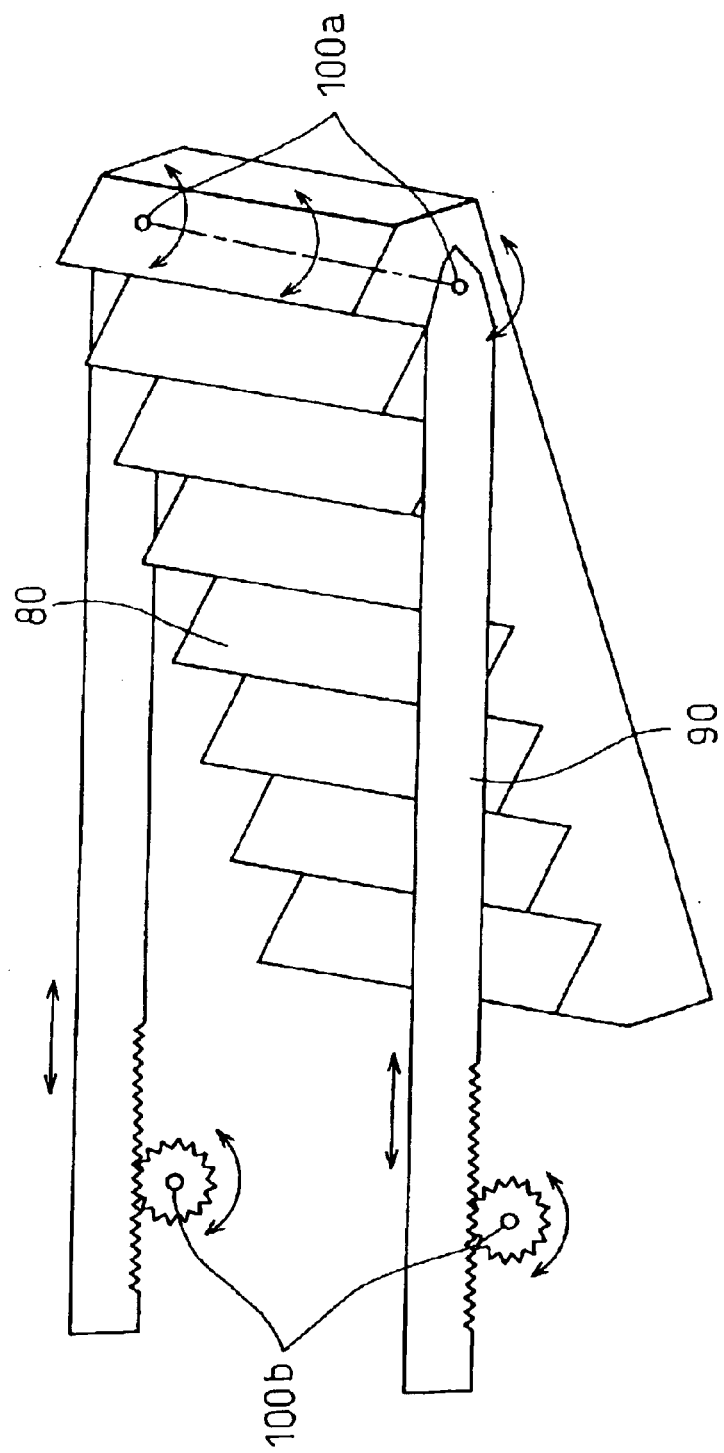
FIG. 23 shows the structure of a movable prism sheet employed in the second embodiment of the present invention.

As shown in FIG. 23, a prism sheet 80 includes stepper motors 100a responsible for rotation of the prism sheet 80, movable shafts 90 and stepper motors 100b responsible for movements in horizontal directions, and movable shafts and stepper motors (not shown) responsible for movements in vertical directions. A control circuit (not shown) controls the stepper motors so as to move or rotate the prism sheet.

Figure 24:
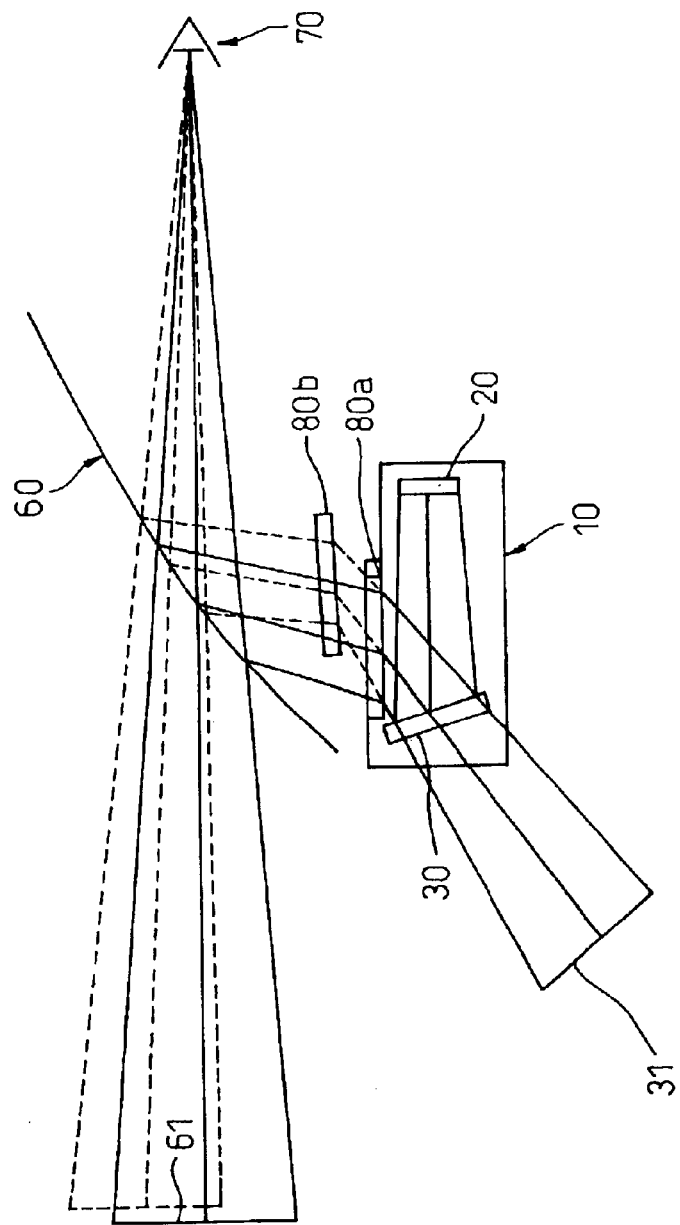
FIG. 24 is an explanatory diagram showing a case where a displayed position is shifted by moving the prism sheet.

Referring to FIG. 24, a description will be made of the fact that a displayed position of an image can be changed owing to the foregoing structure. Normally, the prism sheet 8 is located at a position 80a, and the virtual image 61 is formed at a position indicated with a solid line. The stepper motors 100 are actuated in order to move or rotate the prism sheet to a position 80b indicated with a dot line. Accordingly, the displayed position of the virtual image 61 is changed to a position indicated with a dot line. Thus, the displayed position is changed.

SIXTH EXAMPLE

The sixth example is identical to the first example except that the prism sheet 80 included in the first example is also used as the dustproof cover 40.

Figure 25:
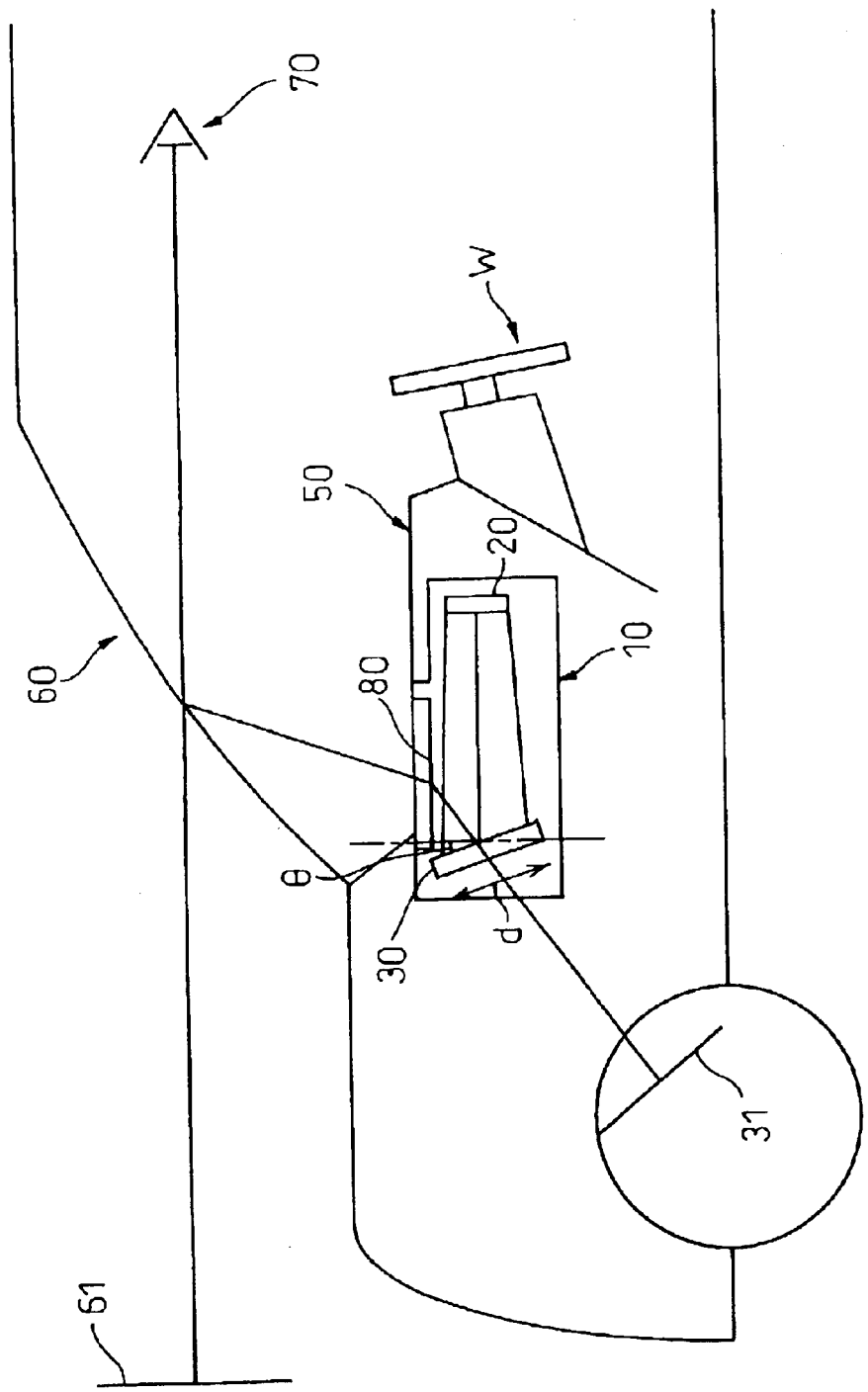
FIG. 25 shows the configuration of the head-up display of the third embodiment in which a prism sheet also serves as a dustproof cover.

As shown in FIG. 25, the prism sheet 80 alone is laid over the opening of the optical unit and also used as a dustproof cover. Consequently, the dustproof cover can be excluded. The optical unit can therefore be designed more compactly. Thus cost of the head-up display can be reduced.

What is claimed is:
1. A head-up display for displaying picture information viewed as a virtual image from a view point, said virtual image is formed by reflecting the picture information projected from an optical unit, the optical unit comprises a display device which emits light of a plurality of wavelength-bands for displaying said picture information and a prism which is located on a light path between said display device and said view point, wherein;
a first position at which light of a first wavelength-band among said a plurality of wavelength-bands is emitted and a second position which light of a second wavelength-band among said a plurality of wavelength-bands is emitted are made different from each other in the picture information formed on said display device by a distance d expressed as follows,

$$d = L1 \times |\phi i1 - \phi i2| + L2 \times |\phi o1 - \phi o2| \times (\cos \phi i1 / \cos \phi o1)$$

and further
$|\phi o1 - \phi o2|$ is within a permissible range;
where L1 denotes the length of the light path between said display device and said prism, L2 denotes the length of the light path between said prism and said view point, $\phi i1$ denotes the angle of incidence at which a light of a center wavelength $\lambda 1$ in said first wavelength-band incidents onto said prism, $\phi o1$ denotes the angle of emergence at which the light emerges from said prism, $\phi i2$ denotes the angle of incidence at which a light having a center wavelength $\lambda 2$ in said second wavelength-band incidents onto said prism, and $\phi o2$ denotes the angle of emergence at which the light emerges from said prism.

2. A head-up display according to claim 1, wherein said prism is a prism sheet.

3. A head-up display according to claim 2, wherein said prism sheet is laid over an opening formed in said optical unit so that picture information can be projected through the opening of said optical unit.

4. A head-up display according to claim 1, wherein the picture information is reflected from a windshield or a combiner.

5. A head-up display according to claim 1, wherein said head-up display is used for vehicles, and said view point is a driver's view point.

6. A head-up display according to claim 1; wherein,
when the light of said wavelength-band has a center wavelength $\lambda$ and a half width $\Delta\lambda$, the angle of incidence at which the light having a wavelength $\lambda 3 = \lambda - \Delta\lambda/2$ incidents onto said prism is $\phi i3$, the angle of emergence at which the light emerges from said prism is $\phi o3$, the angle of incidence at which the light having a wavelength $\lambda 4 = \lambda + \Delta\lambda/2$ incidents onto said prism is $\phi i4$, and the angle of emergence at which the light emerges from said prism is $\phi o4$, a difference $\Delta\phi$ expressed as follows $$\Delta\phi = |\phi o4 - \phi o3| = (L1/L2) \times (\cos \phi o3 / \cos \phi i3) \times |i4 - \phi i3|$$

is within a predetermined permissible range.

7. A head-up display according to claim 1, wherein the predetermined permissible range is a range equal to or smaller than an angle of view subtended by a portion of a virtual image, which can be viewed from the view point, corresponding to one display line in said display device.

8. A head-up display according to claim 1, wherein the predetermined permissible range is a range equal to or smaller than 0.03°.

9. A head-up display according to claim 1, wherein said plurality of ranges are ranges of wavelengths specific to two of red, green, and blue.

10. A head-up display according to claim 1, wherein a light source included in said display device is composed of LEDs.

11. A head-up display according to claim 1, wherein a light source included in said display device is a laser.

12. A head-up display for displaying picture information viewed as a virtual image from a view point, said virtual image is formed by reflecting the picture information projected from an optical unit, the optical unit comprising a display device which emits light of a plurality of wavelength-bands for displaying said picture information and a prism which is located on a light path between said display device and said view point, further comprising an optical element which changes the light path between said display device and said prism, wherein;

the position of each of lights of a plurality of wavelength-bands in said virtual images of said display device formed by said optical element is made different from another in the virtual image of said display device formed by said optical element by a distance d expressed as follows, $$d=L1\times|\phi i1-\phi i2|+L2\times|\phi o1-\phi o2|\times(\cos \phi i1/\cos \phi o1)$$

and further $|\phi o1-\phi o2|$ is within a permissible range;

where L1 denotes the length of the light path between said virtual image of said display device formed by said optical element and said prism, L2 denotes the length of the light path between said prism and said view point, $\phi i1$ denotes the angle of incidence at which a light of a center wavelength $\lambda 1$ in said first wavelength-band incidents onto said prism, $\phi o1$ denotes the angle of emergence at which the light emerges from said prism, $\phi i2$ denotes the angle of incidence at which a light having a center wavelength $\lambda 2$ in said second wavelength-band incidents onto said prism, and $\phi o2$ denotes the angle of emergence at which the light emerges from said prism.

13. A head-up display for displaying picture information viewed as a virtual image from a view point, said virtual image is formed by reflecting the picture information projected from an optical unit, the optical unit comprising a plurality of display devices which emits light of a plurality of wavelength-bands, an optical element which synthesizes lights emitted from said display devices, and a prism which is located on a light path between said display device and said view point, for displaying said picture information, wherein;

the position of each of said virtual images of said a plurality of display devices formed by said optical element is made different from each other by a distance d expressed as follows, $$d=L1\times|\phi i1-\phi i2|+L2\times|\phi o1-\phi o2|\times(\cos \phi i1/\cos \phi o1)$$

and further $|\phi o1-\phi o2|$ is within a permissible range;

where L1 denotes the length of the light path between each virtual image of said plurality of display devices formed by said optical element and said prism, L2 denotes the length of the light path between said prism and said view point, $\phi i1$ denotes the angle of incidence at which a light of a center wavelength $\lambda 1$ in said first wavelength-band incidents onto said prism, $\phi o1$ denotes the angle of emergence at which the light emerges from said prism, $\phi i2$ denotes the angle of incidence at which a light having a center wavelength $\lambda 2$ in said second wavelength-band incidents onto said prism, and $\phi o2$ denotes the angle of emergence at which the light emerges from said prism.

14. A head-up display according to claim 13, wherein the positions of said plurality of display devices are made different from each other in order to make different each position of virtual images of said plurality of display devices formed by said optical element.

15. A signal generator for generating signal to control each of pixels of a display device in a head-up display for displaying picture information viewed as a virtual image from a view point, said virtual image is formed by reflecting the picture information projected from an optical unit, said optical unit comprises said display device which emits light of a plurality of wavelength-bands for displaying said picture information and a prism which is located on a light path between said display device and said view point, wherein;

generating signal to make different the position of the first pixel at which emits light of a first wavelength-band among said a plurality of wavelength-bands and the position of the second pixel which emits light of a second wavelength-band among said a plurality of wavelength-bands from each other on said display device by a distance d expressed as follows, $$d=L1\times|\phi i1-\phi i2|+L2\times|\phi o1-\phi o2|\times(\cos \phi i1/\cos \phi o1)$$

and further $|\phi o1-\phi o2|$ is within a permissible range;

where L1 denotes the length of the light path between said display device and said prism, L2 denotes the length of the light path between said prism and said view point, $\phi i1$ denotes the angle of incidence at which a light of a center wavelength $\lambda 1$ in said first wavelength-band incidents onto said prism, $\phi o1$ denotes the angle of emergence at which the light emerges from said prism, $\phi i2$ denotes the angle of incidence at which a light having a center wavelength $\lambda 2$ in said second wavelength-band incidents onto said prism, and $\phi o2$ denotes the angle of emergence at which the light emerges from said prism.

16. A program that makes a computer realize function of said signal generator in claim 15.

* * * * *